(12) United States Patent
Tsuda

(10) Patent No.: US 10,342,070 B2
(45) Date of Patent: *Jul. 2, 2019

(54) APPARATUS TO ESTABLISH WIRELESS BACKHAUL CONNECTION

(71) Applicant: SONY CORPORATION, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,450

(22) Filed: Jul. 23, 2018

(65) Prior Publication Data

US 2018/0332658 A1 Nov. 15, 2018

Related U.S. Application Data

(63) Continuation of application No. 15/517,948, filed as application No. PCT/JP2015/077218 on Sep. 25, 2015, now Pat. No. 10,064,239.

(30) Foreign Application Priority Data

Oct. 17, 2014 (JP) .................... 2014-212630

(51) Int. Cl.
*H04B 17/00* (2015.01)
*H04W 88/04* (2009.01)
(Continued)

(52) U.S. Cl.
CPC .......... *H04W 88/04* (2013.01); *H04W 16/24* (2013.01); *H04W 16/32* (2013.01); *H04W 48/20* (2013.01); *H04W 84/045* (2013.01); *H04W 88/12* (2013.01); *H04W 24/02* (2013.01); *H04W 76/10* (2018.02); *H04W 92/20* (2013.01)

(58) Field of Classification Search
CPC ..... H04W 88/04; H04W 88/12; H04W 16/32; H04W 48/20; H04W 84/045
See application file for complete search history.

(56) References Cited

U.S. PATENT DOCUMENTS 6,574,452 B1 * 6/2003 Morvan ................ H04L 29/06
455/11.1
10,064,239 B2 * 8/2018 Tsuda .................... H04W 16/32
(Continued)

FOREIGN PATENT DOCUMENTS

EP        2731389 A1    5/2014
JP     2005-136811 A    5/2005
(Continued)

OTHER PUBLICATIONS

Extended European Search Report of EP Patent Application No. 15850220.3, dated Apr. 30, 2018, 11 pages.
(Continued)

*Primary Examiner* — Md K Talukder
(74) *Attorney, Agent, or Firm* — Chip Law Group

(57) ABSTRACT

Provided is an apparatus including: an acquisition unit configured to acquire information indicating one or more second base stations located within coverage of a first base station connected to a wired backhaul; and a controller configured to control establishment of a wireless backhaul between the first base station and each of the one or more second base stations.

20 Claims, 18 Drawing Sheets

(51) Int. Cl.
*H04W 16/32* (2009.01)
*H04W 48/20* (2009.01)
*H04W 84/04* (2009.01)
*H04W 88/12* (2009.01)
*H04W 16/24* (2009.01)
H04W 24/02 (2009.01)
H04W 92/20 (2009.01)
H04W 76/10 (2018.01)

(56) References Cited

U.S. PATENT DOCUMENTS

| | | | | |
|---|---|---|---|---|
| 2008/0008130 | A1* | 1/2008 | Haga | H04W 72/02 370/331 |
| 2008/0076436 | A1* | 3/2008 | Sanders | H04W 76/15 455/450 |
| 2009/0312024 | A1 | 12/2009 | Chen et al. | |
| 2010/0034135 | A1* | 2/2010 | Kim | H04B 7/2606 370/315 |
| 2011/0038308 | A1* | 2/2011 | Song | H04B 7/0408 370/328 |
| 2011/0105119 | A1* | 5/2011 | Bienas | H04W 36/0055 455/436 |
| 2012/0028673 | A1* | 2/2012 | Jeong | H04W 52/244 455/522 |
| 2012/0063383 | A1* | 3/2012 | Barbieri | H04W 72/082 370/315 |
| 2012/0170507 | A1* | 7/2012 | Sawai | H04B 7/0413 370/315 |
| 2012/0231797 | A1* | 9/2012 | Van Phan | H04B 7/15592 455/437 |
| 2013/0188594 | A1* | 7/2013 | Cesar | H04W 72/082 370/329 |
| 2013/0273854 | A1* | 10/2013 | Zhang | H04W 24/02 455/67.11 |
| 2014/0010133 | A1* | 1/2014 | Roebke | H04W 36/14 370/311 |
| 2014/0087720 | A1 | 3/2014 | Takano | |
| 2014/0087750 | A1* | 3/2014 | Taori | H04W 24/02 455/452.2 |
| 2014/0105048 | A1 | 4/2014 | Tellado et al. | |
| 2014/0105136 | A1* | 4/2014 | Tellado | H04L 5/0058 370/329 |
| 2015/0139096 | A1 | 5/2015 | Morioka | |
| 2015/0230168 | A1 | 8/2015 | Sawai | |

FOREIGN PATENT DOCUMENTS

| | | |
|---|---|---|
| JP | 2009-303221 A | 12/2009 |
| JP | 2011-071706 A | 4/2011 |
| JP | 2013-021379 A | 1/2013 |
| JP | 2013-523024 A | 6/2013 |
| JP | 2013-255046 A | 12/2013 |
| JP | 2014-183394 A | 9/2014 |
| WO | 2011/116240 A1 | 9/2011 |
| WO | 2013/183405 A1 | 12/2013 |
| WO | 2014/034255 A1 | 3/2014 |

OTHER PUBLICATIONS

Extended European Search Report of EP Application No. 15850220.3, dated Apr. 30, 2018, 11 pages of EESR.

Notice of Allowance and Fees Due for U.S. Appl. No. 15/517,948, dated Jul. 2, 2018, 02 pages.

Notice of Allowance and Fees Due for U.S. Appl. No. 15/517,948, dated May 31, 2018, 02 pages.

Notice of Allowance and Fees Due for U.S. Appl. No. 15/517,948, dated May 10, 2018, 04 pages.

Notice of Allowance and Fees Due for U.S. Appl. No. 15/517,948, dated Apr. 30, 2018, 10 pages.

Non-Final Rejection for U.S. Appl. No. 15/517,948, dated Oct. 17, 2017, 15 pages.

International Search Report and Written Opinion of PCT Application No. PCT/JP2015/077218, dated Nov. 17, 2015, 09 pages of English Translation and 08 pages of ISRWO.

International Preliminary Report on Patentability of PCT Application No. PCT/JP2015/077218, dated Apr. 27, 2017, 09 pages of English Translation and 06 pages of IPRP.

* cited by examiner

APPARATUS TO ESTABLISH WIRELESS BACKHAUL CONNECTION

CROSS REFERENCE TO RELATED APPLICATIONS

The present application is a continuation application of U.S. patent application Ser. No. 15/517,948, filed Apr. 7, 2017, which is a National Stage of PCT/JP2015/077218, filed Sep. 25, 2015, and claims the benefit of priority from prior Japanese Patent Application JP 2014-212630, filed Oct. 17, 2014. Each of the above-referenced applications is hereby incorporated herein by reference in its entirety.

TECHNICAL FIELD

The present disclosure relates to an apparatus.

BACKGROUND ART

In 2002, the mobile phone service of the 3G system, called the third generation, started in Japan. At first, small-size packets were used for transmission or reception to perform voice calls and mail transmission. However, with the introduction of high-speed downlink packet access (HSDPA), it became possible to transmit and receive larger-size packets for downloading of music files or streaming of video. With such an increase in packet capacities, the service of long term evolution (LTE) in which orthogonal frequency division multiple access (OFDMA) is used on the downlink also started for the expansion on the side of the wireless network. In addition, the launch of 4G services is scheduled to be made around 2015. Accordingly, up to one gigabit per second (Gbps) will be achieved in a semi-fixed environment and up to 100 Mbps will be achieved even in a mobile environment.

With such increase in network traffic, it is desirable to arrange a small base station that is inexpensive and easy to install for preventing the concentration of traffic. Various techniques are developed for such a small cell.

In one example, Patent Literature 1 discloses the technique for selecting a device that operates as an access point for a mobile station based on the quality obtained by measuring a wireless signal transmitted from one or more terminal devices.

CITATION LIST

Patent Literature

Patent Literature 1: WO 2014/034255

DISCLOSURE OF INVENTION

Technical Problem

The hot spot of traffic can change dynamically, and accordingly the location where small cells are preferably arranged can change. In one example, it is also conceivable to arrange a large number of small cells in advance. However, arranging a large number of small cells and connecting a base station of each small cell to a wired backhaul can be a heavy burden on the operator.

Therefore, it is desirable to provide a mechanism for enabling flexible arrangement of cells with a smaller burden.

Solution to Problem

According to the present disclosure, there is provided an apparatus configured to include an acquisition unit and a controller. The acquisition unit configured to acquire information indicating one or more second base stations located within coverage of a first base station connected to a wired backhaul, and the controller is configured to control the establishment of a wireless backhaul between the first base station and each of the one or more second base stations.

Advantageous Effects of Invention

According to the present disclosure as described above, it is possible to perform flexible arrangement of cells with a smaller burden. Note that the effects described above are not necessarily limitative. In conjunction with or in place of the above effects, there may be achieved any one of the effects described in this specification or other effects that may be construed from this specification.

MODE(S) FOR CARRYING OUT THE INVENTION

Figure 1:
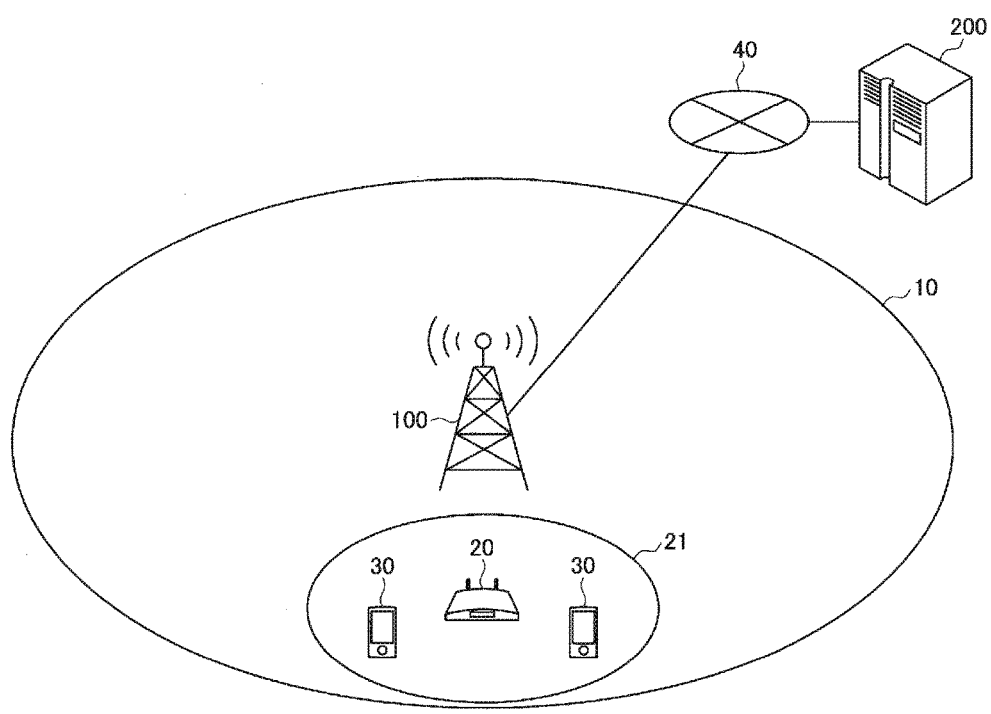
FIG. 1 is a diagram illustrated to describe an exemplary schematic configuration of a system according to an embodiment of the present disclosure.

Hereinafter, (a) preferred embodiment(s) of the present disclosure will be described in detail with reference to the appended drawings. In this specification and the appended drawings, constituent elements that have substantially the same function and structure are denoted with the same reference numerals, and a repeated description of these constituent elements is omitted.

In the specification and drawings, components having substantially identical functional structure are sometimes distinguished by appending different alphabet characters following identical reference numerals. In one example, a plurality of components having substantially identical functional structure are distinguished from each other in a similar way to second base stations 20A, 20B, and 20C, as necessary. However, identical reference numerals are appended to a case where there is no particular significance to distinguish between a plurality of components having substantially identical functional structure. In one example, in the case where there is no particular significance to distinguish between second base stations 20A, 20B, and 20C, they are simply referred to as second base station 20.

The description will be given in the following order.
1. Schematic Configuration of System
2. Configuration of each Device
2.1. Configuration of First Base Station
2.2. Configuration of Control Device
3. First Embodiment
3.1. Technical Features
3.2. Processing Procedure
4. Second Embodiment
4.1. Technical Features
4.2. Processing Procedure
5. Application Examples
5.1. Application Example for Control Device
5.2. Application Example for First Base Station
6. Brief Summary «1. Schematic Configuration of System»

A schematic configuration of a system 1 according to an embodiment of the present disclosure is now described with reference to FIG. 1. FIG. 1 is a diagram illustrated to describe an exemplary schematic configuration of the system 1 according to an embodiment of the present disclosure. Referring to FIG. 1, the system 1 includes a first base station 100, a second base station 20, a terminal device 30, and a control device 200.

(First Base Station 100)

The first base station 100 performs wireless communication with the terminal device 30 located within its own coverage 10. The first base station 100 is connected to a wired backhaul 40. In one example, the first base station 100 is a macrocell base station, and the coverage 10 is a macrocell.

In the embodiment of the present disclosure, the first base station 100 also performs wireless communication with the second base station 20 located within the coverage 10. In particular, the first base station 100 provides a wireless backhaul for the second base station 20. In one example, the first base station 100 performs wireless communication with the second base station 20 using a frequency band that is different from a frequency band used for wireless communication with the terminal device 30. Alternatively, the first base station 100 may perform wireless communication with the second base station 20 using the same frequency band as the frequency band that is used for wireless communication with the terminal device 30.

(Second Base Station 20)

The second base station 20 performs wireless communication with the terminal device 30 located within its own coverage 21. The second base station 20 has no connection with a wired backhaul. In one example, the second base station 20 is a small base station, and the coverage 21 is a small cell. The small cell may also be referred to as microcell, picocell, or femtocell.

In the embodiment of the present disclosure, the second base station 20 also performs wireless communication with the first base station 100. In particular, the second base station 20 performs communication through the wireless backhaul provided by the first base station 100.

In one example, the second base station 20 is a wireless communication device having a first operation mode for operating as a mobile station and a second operation mode for operating as a base station.

In another example, the second base station 20 may only operate as a base station, not a mobile station. The second base station 20 may operate in a first operation mode for performing wireless communication with the terminal device 30 and a second operation mode for stopping wireless communication with the terminal device 30. The second operation mode may be referred to as an off mode, a sleep mode, a standby mode, or the like. The second base station 20 may be a stationary base station.

Moreover, the second base station 20 is an independent base station rather than a relay station. In one example, the second base station 20 has its own retransmission control function. More specifically, in one example, the second base station 20 executes the HARQ process.

(Terminal Device 30)

The terminal device 30 performs wireless communication with a base station. In one example, the terminal device 30, which is located within the coverage of the first base station 100, performs wireless communication with the first base station 100. In one example, the terminal device 30, which is located within the coverage of the second base station 20, performs wireless communication with the second base station 20.

(Control Device 200)

The control device 200 may control the first base station 100. In one example, the control device 200 may control a plurality of first base stations 100.

«2. Configuration of Each Device»

Figure 2:
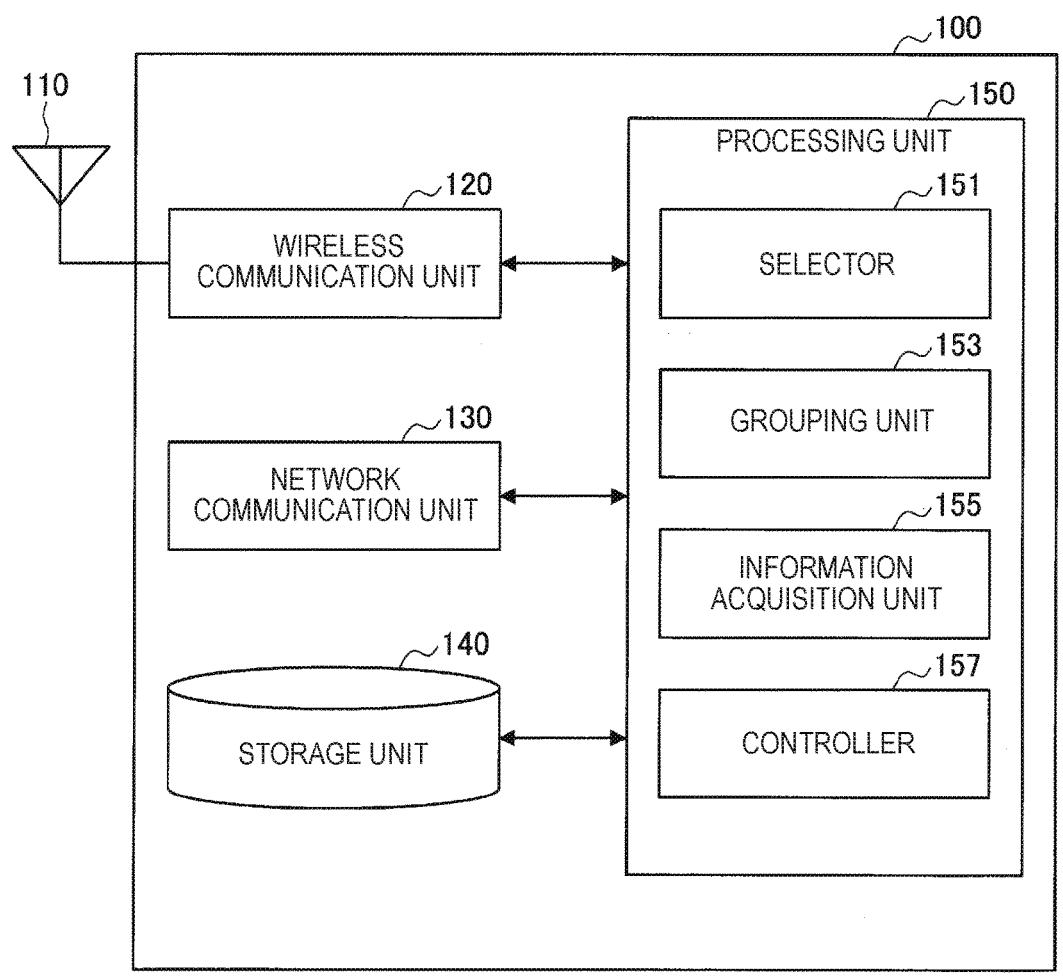
FIG. 2 is a block diagram illustrating an exemplary configuration of a first base station according to the present embodiment.
Figure 3:
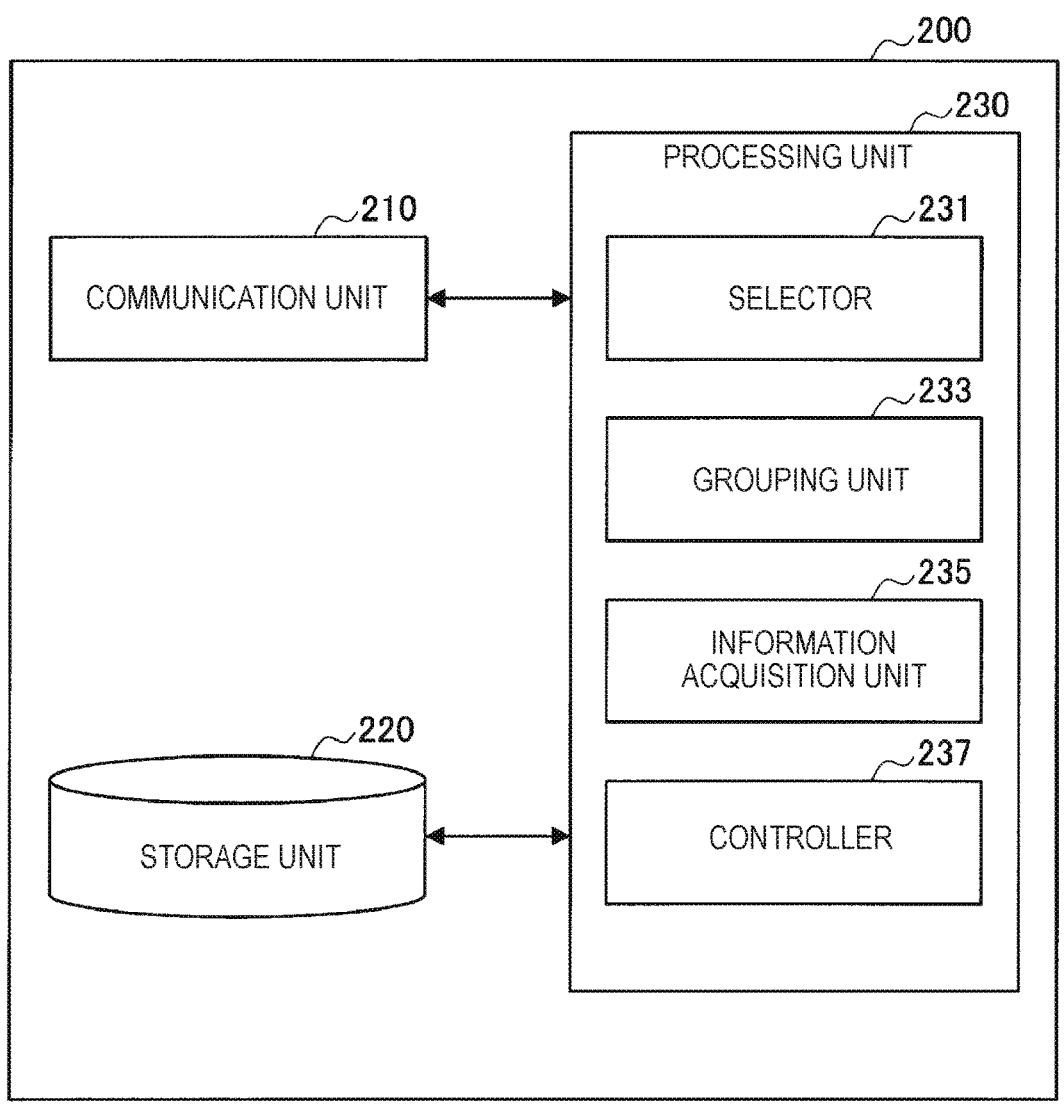
FIG. 3 is a block diagram illustrating an exemplary configuration of a control device according to the present embodiment.

An exemplary configuration of the first base station 100 and the control device 200 according to the embodiment of the present disclosure is now described with reference to FIGS. 2 and 3.

<2.1. Configuration of First Base Station>

An exemplary configuration of the first base station 100 according to the embodiment of the present disclosure is now described with reference to FIG. 2. FIG. 2 is a block diagram illustrating an exemplary configuration of the first base station 100 according to the embodiment of the present disclosure. Referring to FIG. 2, the first base station 100 is configured to include an antenna unit 110, a wireless communication unit 120, a network communication unit 130, a storage unit 140, and a processing unit 150.

(Antenna Unit 110)

The antenna unit 110 radiates a signal outputted from the wireless communication unit 120 into space as a radio wave. In addition, the antenna unit 110 converts a radio wave in space to a signal and outputs the signal to the wireless communication unit 120.

(Wireless Communication Unit 120)

The wireless communication unit 120 transmits and receives a signal. In one example, the wireless communication unit 120 transmits a downlink signal to the terminal device 30 located within the coverage 10 and receives an uplink signal from the terminal device 30 located within the coverage 10. In one example, the wireless communication unit 120 transmits a signal to the second base station 20 located within the coverage 10 and receives a signal from the second base station 20 located within the coverage 10.

(Network Communication Unit 130)

The network communication unit 130 transmits and receives information through the wired backhaul 40. In one example, the network communication unit 130 transmits information to another node through the wired backhaul 40 and receives information from the other node. An example of the other node includes a core network node (e.g., a serving gateway (S-GW) and a mobility management node (MME)). The other node may further include a control device 200.

(Storage Unit 140)

The storage unit 140 temporarily or permanently stores a program and data necessary for the first base station 100 to operate.

(Processing Unit 150)

The processing unit 150 enables the first base station 100 to perform various functions. The processing unit 150 is configured to include a selector 151, a grouping unit 153, an information acquisition unit 155, and a controller 157. Moreover, the processing unit 150 may further include a component other than these components. In other words, the processing unit 150 may also perform an operation other than operations of these components.

A detailed description of operations of the selector 151, the grouping unit 153, the information acquisition unit 155, and the controller 157 will be given later.

<2.2. Configuration of Control Device>

An exemplary configuration of the control device 200 according to the embodiment of the present disclosure is now described with reference to FIG. 3. FIG. 3 is a block diagram illustrating an exemplary configuration of the control device 200 according to the embodiment of the present disclosure. Referring to FIG. 3, the control device 200 is configured to include a communication unit 210, a storage unit 220, and a processing unit 230.

(Communication Unit 210)

The communication unit 210 transmits and receives information. In one example, the communication unit 210 transmits information to another node and receives information from the other node. An example of the other node includes the first base station 100.

(Storage Unit 220)

The storage unit 220 temporarily or permanently stores a program and data necessary for the control device 200 to operate.

(Processing Unit 230)

The processing unit 230 enables the control device 200 to perform various functions. The processing unit 230 is configured to include a selector 231, a grouping unit 233, an information acquisition unit 235, and a controller 237. Moreover, the processing unit 230 may further include a component other than these components. In other words, the processing unit 230 may also perform an operation other than operations of these components.

A detailed description of operations of the selector 231, the grouping unit 233, the information acquisition unit 235, and the controller 237 will be given later.

«3. First Embodiment»

A first embodiment of the present disclosure is described with reference to FIGS. 4 to 14.

<3.1. Technical Features>

Technical features according to the first embodiment are described with reference to FIGS. 4 to 13.

(1) Selection of Second Base Station 20

In one example, the first base station 100 (the selector 151) selects one or more of the second base stations 20 located within the coverage 10 of the first base station 100.

(a) Trigger for Selection

In one example, the first base station 100 (the selector 151) selects the one or more second base stations 20 in the case where a predetermined condition on traffic of the first base station 100 is satisfied.

In one example, the predetermined condition is that the traffic volume of the first base station 100 exceeds a threshold value. In other words, the first base station 100 (the selector 151) selects the one or more second base stations 20 in the case where the traffic volume of the first base station 100 exceeds the threshold value.

In one example, the first base station 100 (the selector 151) monitors the traffic volume in real time or periodically. The traffic may be traffic processed previously by the first base station 100 or traffic to be processed by the first base station 100. The traffic volume may be the average value of a traffic volume to be processed by the first base station within a certain period.

This makes it possible, for example, to enhance the traffic volume that can be processed within the coverage 10 with the increase of traffic of the first base station 100.

(b) Selection Technique

In one example, the first base station 100 (the selector 151) selects the one or more second base stations 20 from among a plurality of second base stations 20 located within the coverage 10 of the first base station 100.

(b-1) Selection Depending on Position and Traffic Volume of Terminal Device 30

In one example, the first base station 100 (the selector 151) selects the one or more second base stations 20 depending on the position and traffic volume of the terminal device 30 performing wireless communication with the first base station 100. In one example, the one or more second base stations 20 are base stations that are located within an area with high traffic density in the coverage 10.

Specifically, in one example, the first base station 100 (the selector 151) finds an area with a high traffic volume within the coverage 10 from the positions and traffic volumes of the plurality of terminal devices 30 performing wireless communication with the first base station 100. Then, the first base station 100 (the selector 151) selects one or more second base stations 20 located in the relevant area (or near the area).

The area may be a sector with high traffic density among two or more sectors included in the coverage 10. Specifically, the first base station 100 (the selector 151) may calculate the traffic volume of each of two or more sectors included in the coverage 10. Then, the first base station 100 (the selector 151) may find a sector with a high traffic volume (e.g., a sector whose traffic volume exceeds a threshold value) and may select one or more second base stations 20 located in the sector.

(b-2) Information Relating to Second Base Station 20

In one example, the first base station 100 holds information that is related to the second base station 20 located within the coverage 10 and selects the one or more second base stations 20 based on the information.

Moreover, the information described above can be changed dynamically. In one example, in the case where a new second base station 20 is located within the coverage 10, the information may include additionally information relating to the new second base station 20.

As described above, the first base station 100 (the selector 151) selects the one or more second base stations 20. This makes it possible, for example, to arrange cells according to dynamically changing traffic conditions.

(2) Control of Wireless Backhaul Establishment

The first base station 100 (the information acquisition unit 155) acquires information indicating one or more second base stations 20 located within the coverage 10 of the first base station 100. The first base station 100 (the controller 157) controls the establishment of a wireless backhaul between the first base station 100 and each of the one or more second base stations 20.

(a) One or More Second Base Stations 20

In one example, the one or more second base stations 20 are one or more second base stations selected by the selector 151 as described above. The information acquisition unit 155 acquires information indicating one or more second base stations 20 selected by the selector 151.

(b) Example of Control

In one example, the control of the establishment of the wireless backhaul as described above includes performing a procedure for establishing the wireless backhaul with each of the one or more second base stations 20 (hereinafter referred to as "backhaul establishment procedure").

(b-1) Providing Information for Backhaul Establishment

In one example, the backhaul establishment procedure includes providing information for establishing a wireless backhaul between the first base station 100 and the second base station 20 (hereinafter referred to as "information for backhaul establishment") for the base station 20.

Contents of Information for Backhaul Establishment

In one example, the information for backhaul establishment includes identification information of a base station to be connected (i.e., identification information of the first base station 100), information indicating a frequency band for the wireless backhaul, information indicating the maximum transmission power for the wireless backhaul, and/or information indicating a duplex scheme to be applied. This makes it possible, for example, for the second base station 20 to perform settings for establishing the wireless backhaul.

Furthermore, the information for backhaul establishment may include trigger information used to trigger switching between operation modes of the second base station 20. The switching may be the switching from a first operation mode to a second operation mode. In one example, the first operation mode is the operation mode for operating as a mobile station, and the second operation mode is the operation mode for operating as a base station. In another example, the first operation mode may be the operation mode for performing wireless communication with the terminal device 30, and the second operation mode may be the second operation mode for stopping wireless communication with the terminal device 30 (e.g., off mode, sleep mode, and standby mode). In addition, the trigger information may include identification information of the second base station 20 to be switched between operation modes. The identification information may be a cell ID of a base station in the case of operating as a base station, and may be information for identifying a mobile station (e.g., UE identify index, SAE temporary mobile subscriber identity (S-TMSI), and international mobile subscriber identity (MI)).

Providing Technique

In one example, the first base station 100 (the controller 157) broadcasts the information for backhaul establishment. Specifically, in one example, the first base station 100 (the controller 157) broadcasts system information including the information for backhaul establishment. In this regard, the second base station 20 operating as a mobile station, when it is determined that the second base station 20 is a target whose operation mode is to be switched based on the identification information included in the broadcasted system information, may perform switching between operation modes based on the trigger information.

Alternatively, the first base station 100 (the controller 157) may provide the information for backhaul establishment using paging technique for the one or more second base stations 20. Specifically, the first base station 100 (the controller 157) notifies the one or more second base stations 20 by paging, and then may provide the information for backhaul establishment for each of the one or more second base stations 20.

Moreover, one of broadcasting and paging may be selected depending on the number of second base stations 20 included in the one or more second base stations 20. In one example, if the number is one, then paging may be selected, but if the number is two or more, the broadcasting may be selected.

(b-2) Operation in Response to Connection Request

In one example, the backhaul establishment procedure includes an operation to be performed in response to a connection request from the second base station 20.

Specifically, in one example, the first base station 100 (the controller 157) performs processing necessary for the wireless backhaul, such as securing a wireless resource (e.g., securing a frequency band and a period) and/or scheduling a wireless resource, in response to a connection request from the second base station 20. Furthermore, in one example, the first base station 100 (the controller 157) responds to the connection request. In one example, the second base station 20 is notified that the wireless backhaul is established as the response. In this regard, the securing and/or scheduling of a wireless resource may be controlled dynamically based on the traffic volume processed by the second base station 20. In one example, for the second base station 20 that handles a relatively high traffic volume, wireless resources more than those of other second base stations 20 are secured. Moreover, the information relating to traffic may be notified from the second base station 20 to the first base station 100 through the control plane. In addition, notification of the information relating to traffic to the base station 100 may be triggered with a change in traffic. In other words, when the traffic to be processed is increased or decreased significantly, the notification described above may be performed. Furthermore, the securing and scheduling of wireless resources may be controlled dynamically based on the quality of communication between the first base station 100 and the second base station 20. The communication quality may be reference signal received power (RSRP), reference signal received quality (RSRQ), or channel quality indicator (CQI) included in the measurement result reported by the second base station 20. In this regard, the wireless resource may be secured in units of resource blocks.

In one example, the establishment of wireless backhaul between the first base station 100 and each of the one or more second base stations 20 is controlled as described above. This makes it possible, for example, to arrange cells according to dynamically changing traffic conditions.

(3) Plurality of Second Base Stations

In one example, the first base station 100 (the selector 151) selects a plurality of second base stations 20 located within the coverage 10 of the first base station 100. Furthermore, the first base station 100 (the information acquisition unit 155) acquires the information indicating the plurality of second base stations 20. The first base station 100 (the controller 157) controls the establishment of the wireless backhaul between the first base station 100 and each of the one or more second base stations 20.

(4) Grouping of Second Base Stations 20

In one example, the first base station 100 (the grouping unit 153) performs grouping of the plurality of second base stations 20. In this grouping, the second base stations 20 that can have mutually independent paths in wireless communication with the first base station 100 (hereinafter referred to as "independent path") are placed in the same group.

Moreover, in one example, the first base station 100 simultaneously performs wireless communication with the second base stations 20 included in the same group using the same frequency band (e.g., the same component carrier), which will be described later.

(a) Independent Path

In one example, the independent path is a path having low correlation with each other, a path that does not interfere with each other, or a path where interference is equal to or less than a threshold value. Moreover, the independent path may be a path obtained by performing the precoding process based on channel information.

(b) Example of Grouping

Figure 4:
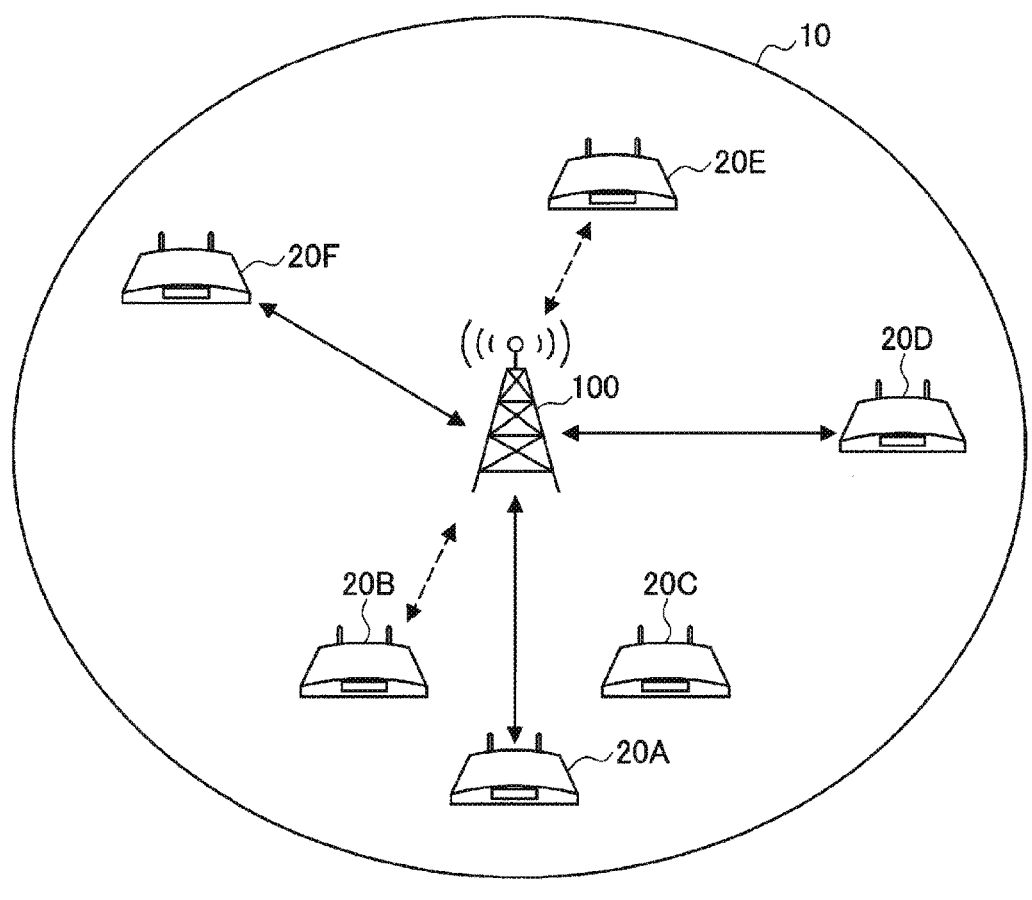
FIG. 4 is a diagram illustrated to describe an example of grouping of a plurality of second base stations.

FIG. 4 is a diagram illustrated to describe an example of grouping of the plurality of second base stations 20. Referring to FIG. 4, the first base station 100 and six second base stations 20 (i.e., second base stations 20A to 20F) located within the coverage 10 of the first base station 100 are illustrated. In this example, five second base stations 20 (i.e., the second base stations 20A, 20B, 20D, 20E, and 20F) are selected from among the six second base stations 20. Then, the five second base stations 20 are grouped. The second base stations 20A, 20D, and 20F can have mutually independent paths in wireless communication with the first base station 100, and grouping of them allows a first group to which the second base stations 20A, 20D, and 20F belong to be obtained. Furthermore, the second base stations 20B and 20E can also have mutually independent paths in wireless communication with the first base station 100, and grouping of them allows a second group to which the second base stations 20B and 20E belong to be obtained.

(c) Limitation on the Number of Second Base Stations 20

In one example, the first base station 100 (the grouping unit 153) performs the grouping such that the number of second base stations 20 included in each group is equal to or less than the number of antenna elements or transceivers provided in the first base station 100.

(d) Downlink/Uplink

In one example, the first base station 100 (the grouping unit 153) performs the process of grouping the plurality of second base stations 20 for each of downlink and uplink. In other words, the grouping unit 153 performs the grouping for the downlink, and thereby obtaining one or more groups for the downlink. Furthermore, the grouping unit 153 performs the grouping for the uplink, and thereby obtaining one or more groups for the uplink.

This makes it possible, for example, to perform wireless communication suitable for each of downlink and uplink.

Moreover, the downlink in this example is the link directed from the first base station 100 to the second base station 20, and the uplink in this example is the link directed from the second base station 20 to the first base station 100.

(d-1) Downlink

In one example, the use of multi-user multiple-input multiple-output (MIMO) allows the plurality of second base stations 20 to have independent paths. In one example, independent paths can be formed by spatial multiplexing or beamforming. In spatial multiplexing, the precoding process is performed. In beamforming, a multiplication of a set of antenna weights is performed.

Thus, in one example, the grouping for the downlink allows the second base station 20 that is a target of transmission by the multi-user MIMO (i.e., the second base station 20 capable of having the independent path) to be placed in the same group.

Moreover, in the grouping for the downlink, the second base stations 20 that are difficult to interfere with each other in wireless communication with the first base station 100 may be placed in the same group.

(d-2) Uplink

In one example, in the grouping for the uplink, the second base stations 20 that are difficult to interfere with each other in the wireless communication with the first base station 100 are placed in the same group.

Moreover, the grouping for the uplink allows the second base station 20 that is a target of reception by the multi-user MIMO (i.e., the second base station 20 capable of having the independent path) to be placed in the same group.

(d-3) Example of Grouping

The one or more groups for the uplink may differ from the one or more groups for the downlink.

Referring again to FIG. 4, in one example, the grouping for the uplink allows a group to which the second base stations 20A, 20D, and 20F belong to be obtained. On the other hand, the grouping for the downlink allows a group to which the second base stations 20A and 20F belong and a group to which only the second base station 20D belongs to be obtained. Thus, in one example, transmission to the second base station 20D is performed on the downlink by single-user MIMO. This is particularly effective in the case where the traffic volume of the second base station 20D is large.

As described above, in one example, the grouping is performed for each of the downlink and the uplink, but the first embodiment is not limited to this example. The grouping may be performed only for the downlink, or the grouping may be performed for only the uplink.

(e) Grouping Based on Information Relating to Position of Second Base Station 20

In one example, the first base station 100 (the grouping unit 153) performs the grouping of the plurality of second base stations 20 based on the information relating to a position of each of the plurality of second base stations 20.

(e-1) Information Relating to Position

In one example, the information relating to a position is information indicating a position of each of the plurality of second base stations 20. The position may be a position relative to the first base station 100 or may be an absolute position.

In another example, the information relating to a position may be information indicating the direction directed from the first base station 100 to the second base station 20. The direction may be calculated by estimating the direction of arrival of a signal transmitted by the second base station 20.

(e-2) Example of Grouping

In one example, the grouping unit 153 places the second base stations 20 located in different directions by more than a predetermined degree in the same group. An example of the grouping is now described with reference to FIG. 5.

Figure 5:
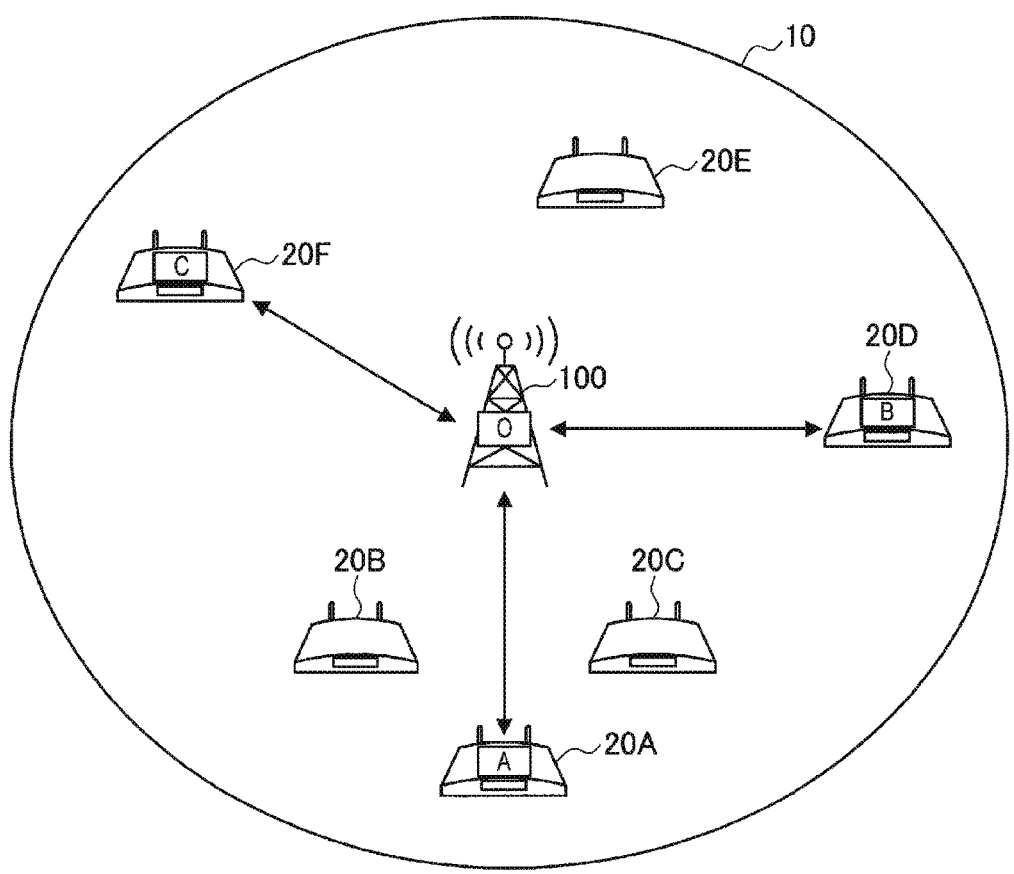
FIG. 5 is a diagram illustrated to describe an example of grouping based on information relating to position.

FIG. 5 is a diagram illustrated to describe an example of the grouping based on the information relating to a position. Referring to FIG. 5, the first base station 100 and the six second base stations 20 (i.e., the second base stations 20A to 20F) are illustrated, which is similar to FIG. 4. In one example, provided that the position of the first base station 100 is represented by O and the positions of the second base stations 20A, 20D, and 20F are represented by A, B, and C, respectively, the angles formed by AOB, BOC, and COA are all equal to or larger than a threshold value (e.g., 90 degrees). Thus, the grouping allows the second base stations 20A, 20D, and 20F to be placed in the same group.

The predetermined degree (e.g., the threshold value) may be determined depending on the directivity of an antenna of the first base station 100 and/or the directivity of an antenna of the second base station 20. In this regard, the directivity may be the directivity of the antenna alone, the directivity of an array of the antennas, or the directivity obtained by beamforming. Moreover, the antenna may be an antenna of a remote radio head (RRH). In addition, in the case where the antenna of the first base station 100 is arranged for each sector, the angle between the sectors may be taken into consideration to determine the threshold value.

As described above, the grouping may be performed based on the information relating to the position of the second base station 20. This makes it possible, for example, for the second base station 20 capable of having an independent path to be placed in the same group.

(f) Grouping Based on Information Relating to Traffic of Second Base Station 20

In one example, the first base station 100 (the grouping unit 153) performs the grouping of the plurality of second base stations 20 based on information relating to traffic of each of the plurality of second base stations 20. In one example, the information relating to traffic is information indicating a traffic volume.

Specifically, in one example, in the case where the traffic of one second base station 20 out of two or more second base stations 20 included in one group is larger than the traffic of another second base station 20, the one second base station 20 is placed in another group (e.g., a new group). A specific example is now described with reference to FIG. 6.

Figure 6:
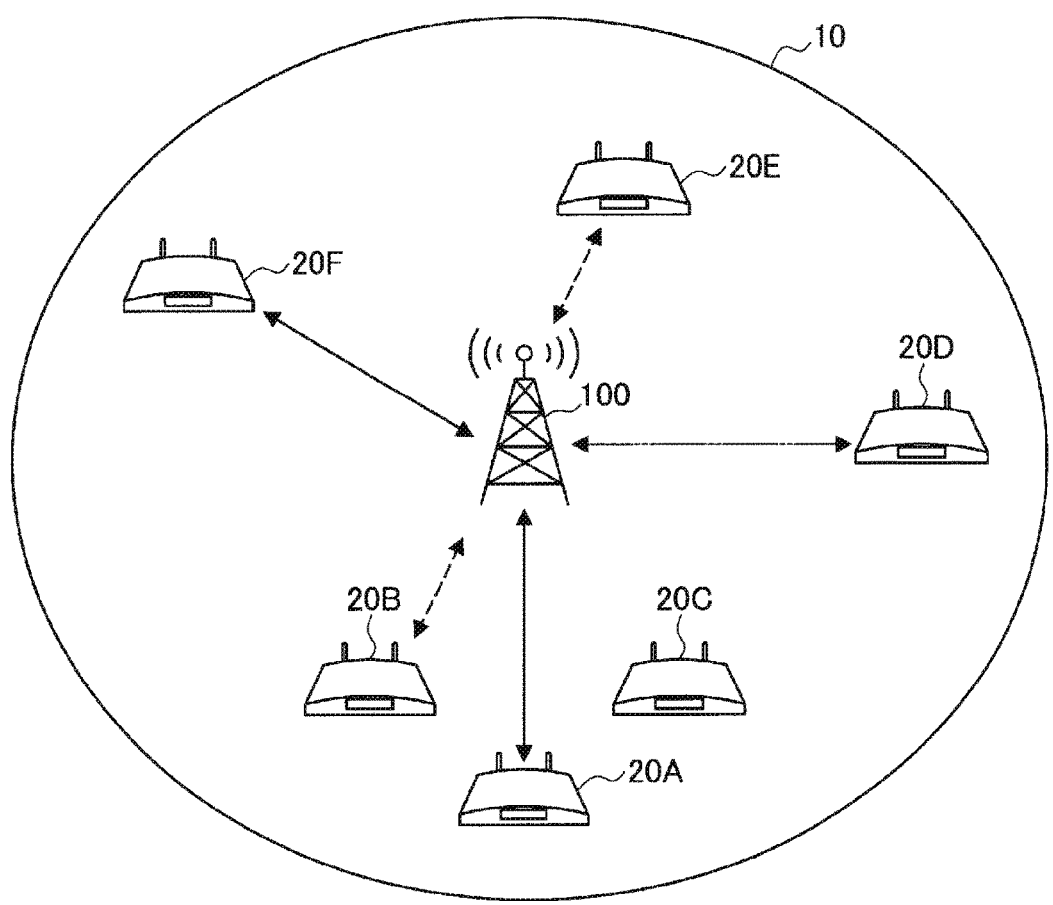
FIG. 6 is a diagram illustrated to describe an example of grouping based on information relating to traffic.

FIG. 6 is a diagram illustrated to describe an example of the grouping based on the information relating to traffic. Referring to FIG. 6, the first base station 100 and the six second base stations 20 (i.e., the second base stations 20A to 20F) are illustrated, which is similar to FIG. 4. In this example, the second base stations 20A, 20D, and 20F belong to the first group, which is similar to FIG. 4, but with the increase in the traffic volume of the second base station 20D, the second base station 20D is excluded from the first group and placed in a third group (a new group).

This makes it possible, for example, to adjust the data rate in the wireless backhaul for the second base station 20 with the increase or decrease in the traffic volume of the second base station 20. In one example, for the second base station 20D belonging to the third group, the transmission at a high data rate by spatial multiplexing or beamforming can be performed by single-user MIMO.

(g) Grouping Based on Result of Measurement by Second Base Station 20

The first base station 100 (the grouping unit 153) may perform the grouping of the plurality of second base stations 20 based on a result obtained by measuring the reference signal by each of the plurality of second base stations 20.

(g-1) Measurement

The measurement may be a measurement of the reception power of the reference signal, and the measurement result may be the reception power. Specifically, the measurement may be a measurement of the reference signal received signal (RSRP), and the measurement result may be the RSRP. The second base station 20 may perform the measurement and may report the measurement result to the first base station 100. The first base station 100 may instruct the second base station 20 to report the measurement.

The first base station 100 may transmit different reference signals to each antenna port (or each group of antennas), and the measurement may be a measurement for each antenna port (or each group of antennas). An example of the reference signal is now described with reference to FIG. 7.

Figure 7:
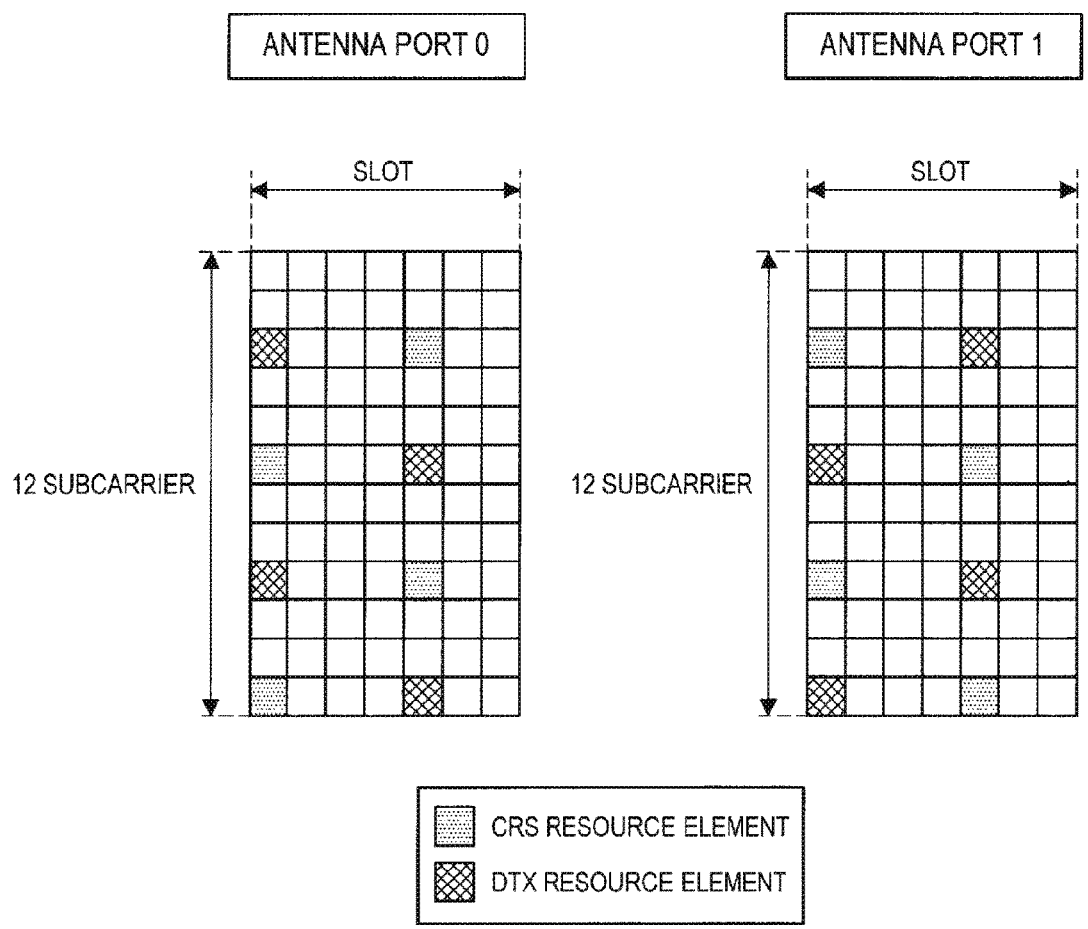
FIG. 7 is a diagram illustrated to describe an example of a reference signal in a case of two layers.

FIG. 7 is a diagram illustrated to describe an example of a reference signal in the case of two layers. Referring to FIG. 7, resource blocks of an antenna port 0 and an antenna port 1 are illustrated. The resource block has 12 subcarriers in the frequency direction and has one slot in the time direction. The first base station 100 transmits a cell-specific reference signal (CRS) through the antenna port 0 using some resource elements of each resource block, and transmit the CRS through the antenna port 1 using some other resource elements of each resource block. The second base station 20 performs a measurement for each of the antenna ports 0 and 1.

Moreover, the example in which the reference signal is the CRS has been described, but the reference signal is not limited to this example. In one example, the reference signal may be a UE-specific reference signal known as a demodulation reference signal (DM-RS).

(g-2) Example of Grouping

First Example

In a first example, the following RSRPs are obtained as a measurement result of each of the second base stations 20A and 20B.

TABLE 1

|  | Second Base Station 20A | Second Base Station 20B |
|---|---|---|
| RSRP (Port 0) | −60 dBm | −58 dBm |
| RSRP (Port 1) | −95 dBm | −97 dBm |

In this example, the second base stations 20A and 20B measure the similar RSRPs at the antenna ports 0 and 1, and thus it is determined that they fail to have an independent path. Thus, the second base stations 20A and 20B are not placed in the same group.

Second Example

In a second example, the following RSRPs are obtained as a measurement result of each of the second base stations 20A and 20B.

TABLE 2

|  | Second Base Station 20A | Second Base Station 20B |
|---|---|---|
| RSRP (Port 0) | −60 dBm | −95 dBm |
| RSRP (Port 1) | −97 dBm | −62 dBm |

In this example, the second base stations 20A and 20B measure significantly different RSRPs at the antenna ports 0 and 1, and thus it is determined that they can have an independent path. Thus, the second base stations 20A and 20B are placed in the same group.

As described above, the grouping may be performed based on the result of the measurement performed by the second base station 20. This makes it possible, for example, to place the second base station 20 capable of having an independent path in the same group. In other words, this is equivalent to the fact that the first base station 100 estimates the direction of arrival of the second base station 20 (e.g., the second base stations 20A and 20B).

(h) Grouping Based on Information Relating to Antenna of Second Base Station 20

The first base station 100 (the grouping unit 153) may perform the grouping of the plurality of second base stations 20 based on information relating to the antenna of each of the plurality of second base stations 20.

The information relating to the antenna may indicate the number of antennas included in the second base station 20, the directivity of the antenna, the correlation coefficient between the antennas, and the like.

The first base station 100 (the grouping unit 153) may calculate the number of data streams that can be transmitted or received simultaneously based on the information relating to the antenna and may perform the grouping based on the calculated number.

In one example, the plurality of second base stations 20 are grouped as described above. This makes it possible, for example, to increase the data rate in the wireless backhaul.

(5) Allocation to Group

In one example, the first base station 100 (the controller 157) perform allocation to each of two or more groups.

(a) Allocation of Period

In one example, the first base station 100 (the information acquisition unit 155) acquires information indicating two or more groups obtained by grouping the plurality of second base stations 20. Then, the first base station 100 (the controller 157) allocates different periods for wireless communication with the first base station 100 to each of the two or more groups.

(a-1) Period

In one example, the different periods are one or more different subframes. In other words, one or more different subframes for wireless communication with the first base station 100 are allocated to each of the two or more groups. A specific example is now described with reference to FIGS. 8 and 9.

Figure 8:
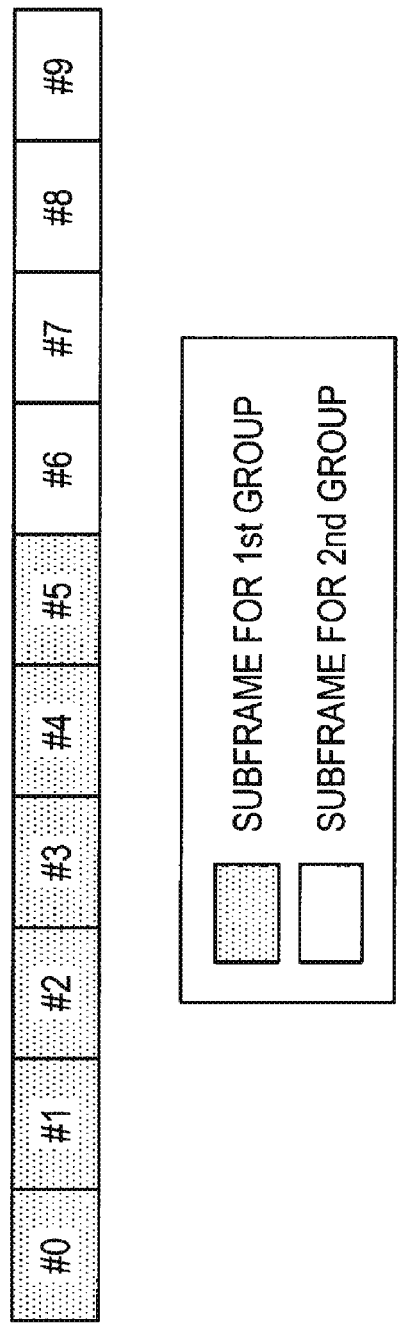
FIG. 8 is a diagram illustrated to describe a first example of a subframe allocated to each group.

FIG. 8 is a diagram illustrated to describe a first example of a subframe allocated to each group. Referring to FIG. 8, 10 subframes (i.e., one wireless frame) are illustrated. In one example, as in the example of FIG. 4, a first group and a second group are obtained by grouping a plurality of second base stations 20. In this example, consecutive subframes with subframe numbers 0 to 5 are allocated to the first group, and consecutive subframes with subframe numbers 6 to 9 are allocated to the second group.

Figure 9:
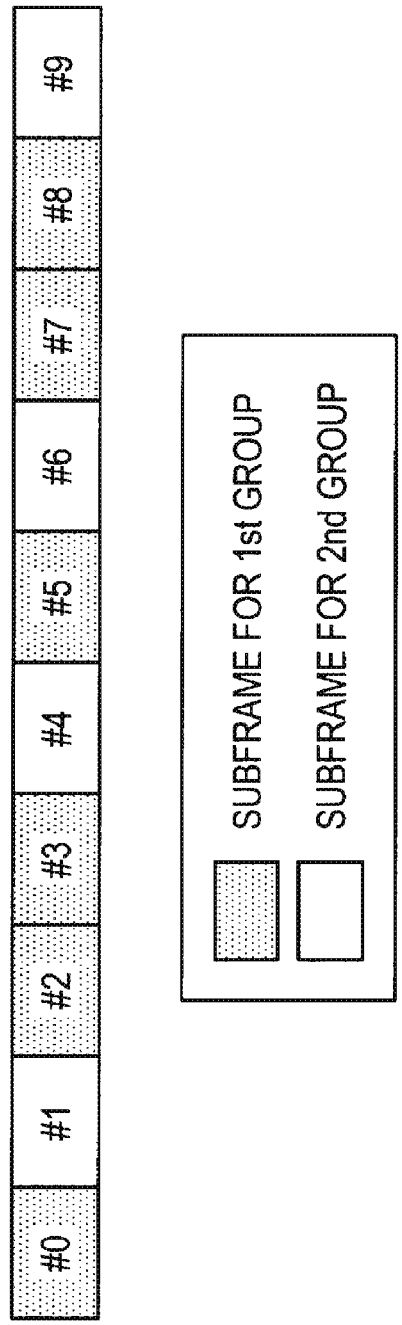
FIG. 9 is a diagram illustrated to describe a second example of a subframe allocated to each group.

FIG. 9 is a diagram illustrated to describe a second example of a subframe allocated to each group. Referring to FIG. 9, 10 subframes (i.e., one wireless frame) are illustrated. In one example, as in the example of FIG. 4, a first group and a second group are obtained by grouping a plurality of second base stations 20. In this example, subframes with subframe numbers 0, 3, 5, 7, and 8 are allocated to the first group, and subframes with subframe numbers 1, 2, 4, 6, and 9 are allocated to the second group.

Alternatively, the different periods may be one or more different wireless frames or may be one or more different slots, instead of the one or more different subframes.

(a-2) Operation of Second Base Station 20 in Allocated Period

In one example, the first base station 100, in a period allocated to a group, performs wireless communication with two or more second base stations 20 belonging to the group using the same frequency band. In one example, the first base station 100 simultaneously performs wireless communication with two or more second base stations 20 belonging to the group using the same frequency band by multi-user MIMO.

Referring again to FIGS. 4 and 8, in one example, the first base station 100 simultaneously performs wireless communication with the second base stations 20A, 20D, and 20F belonging to the first group using the same frequency band by multi-user MIMO in the subframes (subframes with subframe numbers 0 to 5) allocated to the first group. The first base station 100 simultaneously performs wireless communication with the second base stations 20B and 20E belonging to the second group using the same frequency by multi-user MIMO in the subframes (subframes with subframe numbers 6 to 9) allocated to the second group.

(b) Allocation of Frequency Band

The first base station 100 (the controller 157) may allocate different frequency bands for wireless communication with the first base station 100 to each of the two or more groups. The frequency band may be a component carrier.

Referring again to FIG. 4, in one example, the first group and the second group are obtained by grouping the plurality of second base stations 20. In this case, a first component carrier may be allocated to the first group, and a second component carrier may be allocated to the second group.

The first base station 100 may use the frequency band allocated to a group to perform simultaneously wireless communication with two or more second base stations 20 belonging to the group. In one example, the first base station 100 may perform simultaneously wireless communication with two or more second base stations 20 belonging to the group using the frequency band by multi-user MIMO.

(c) Others

Downlink/Uplink

The first base station 100 (the controller 157) may allocate different periods (or different frequency bands) for wireless communication with the first base station 100 to each of the two or more groups for each of downlink and uplink.

Allocation Depending on Change in Traffic

Furthermore, the first base station 100 (the controller 157) also may dynamically change the allocation of the period (or the frequency band) (e.g., depending on the change in traffic).

The allocation to the group performed as described above makes it possible, for example, to increase the data rate in the wireless backhaul.

(6) Allocation of Antenna Element

In one example, the first base station 100 (the information acquisition unit 155) acquires information indicating a group obtained by grouping the plurality of second base stations 20. Then, the first base station 100 (the controller 157) allocates one or more antenna elements among a plurality of antenna elements of the first base station 100 to each of the second base stations 20 belonging to the group.

Furthermore, in one example, the first base station 100 (the controller 157) allocates one or more antenna elements out of the plurality of antenna elements to each of the transceivers included in the first base station 100. In one example, each transmitter corresponds to any one of the second base stations 20.

(a) Allocation Technique (a-1) First Example: Direction of Arrival of Signal Transmitted by Second Base Station 20

In a first example, the first base station 100 (the controller 157) allocates the one or more antenna elements to each of the second base stations 20 belonging to the group based on information relating to the direction of arrival of a signal transmitted by each of the second base stations 20 belonging to the group.

In one example, the information relating to the direction of arrival is information indicating the direction of arrival. In this case, in one example, the first base station 100 estimates the direction of arrival. Alternatively, the information relating to the direction of arrival may be information indicating the position of the second base station 20, and the first base station 100 may estimate the direction of arrival based on the position.

In one example, the first base station 100 (the controller 157) allocates one or more antenna elements suitable for the direction of arrival of the signal transmitted by the second base station 20 from among the plurality of antenna elements to the second base stations 20. In one example, the one or more antenna elements suitable for the direction of arrival are one or more antenna elements suitable for transmitting or receiving a signal to or from the direction of arrival.

(a-2) Second Example: Quality of Propagation Channel

In a second example, the first base station 100 (the controller 157) may allocate the one or more antenna elements to each of the second base stations 20 belonging to the group. This allocation is performed based on information relating to the quality of a propagation channel between each of the second base stations 20 belonging to the group and the first base station 100.

The information relating to the quality of the propagation channel may be the result of measurement performed by the second base station 20. The measurement may be a measurement of reception power and/or reception quality of the reference signal transmitted by the first base station 100. The reference signal may be the CRS or may be other reference signals (e.g., DM-RS). More specifically, the measurement may be a measurement of the RSRP and/or reference signal received quality (RSRQ). The first base station 100 may acquire the measurement result through a measurement report by the second base station 20. The first base station 100 may instruct the second base station 20 to report the measurement.

The measurement may be a measurement of the reference signal transmitted for each antenna element, and an antenna element with a more satisfactory measurement result may be allocated to the second base station 20. In this case, the first base station 100 may transmit the reference signal for each antenna element.

(b) Example of Allocation (b-1) First Example

Figure 10:
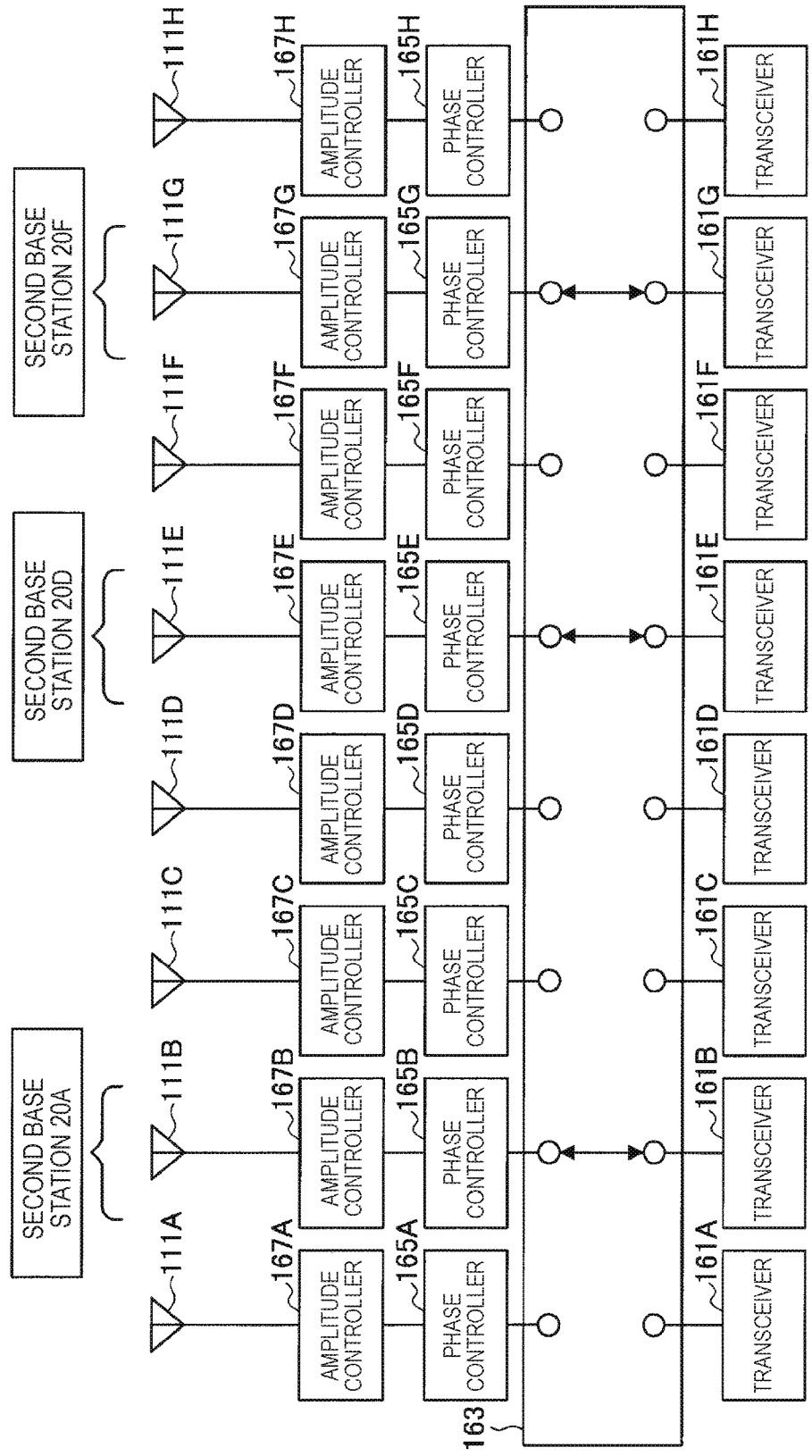
FIG. 10 is a diagram illustrated to describe a first example of allocation of an antenna element to each of the second base stations.

FIG. 10 is a diagram illustrated to describe a first example of allocation of antenna elements to each of the second base stations 20. Referring to FIG. 10, there are illustrated an antenna element 111, a transceiver 161, a switch 163, a phase controller 165, and an amplitude controller 167, which are included in the first base station 100. In this example, the antenna elements 111B, 111E, and 111G are allocated to the second base stations 20A, 20D, and 20F, respectively. The switch 163 connects the transceivers 161B, 161E, and 161G to the antenna elements 111B, 111E, and 111G, respectively. The transceivers 161B, 161E, and 161G perform processing for transmission and reception to and from the second base stations 20A, 20D, and 20F, respectively. The first base station 100 wirelessly communicates with the second base stations 20A, 20D, and 20F belonging to the same group by multi-user MIMO, using the antenna elements 111B, 111E, and 111G, respectively.

In the example of FIG. 10, the number of the antenna elements 111, the number of the transceivers 161, the number of the phase controllers 165, and the number of the amplitude controllers 167 are respectively eight, but it should be appreciated that these numbers are not limited to eight. In addition, in the example of FIG. 10, these numbers are the same number (i.e., 8), but it should be appreciated that these numbers may be different. In these regards, the examples of FIGS. 11 and 12 are also similar to the example of FIG. 10.

Figure 12:
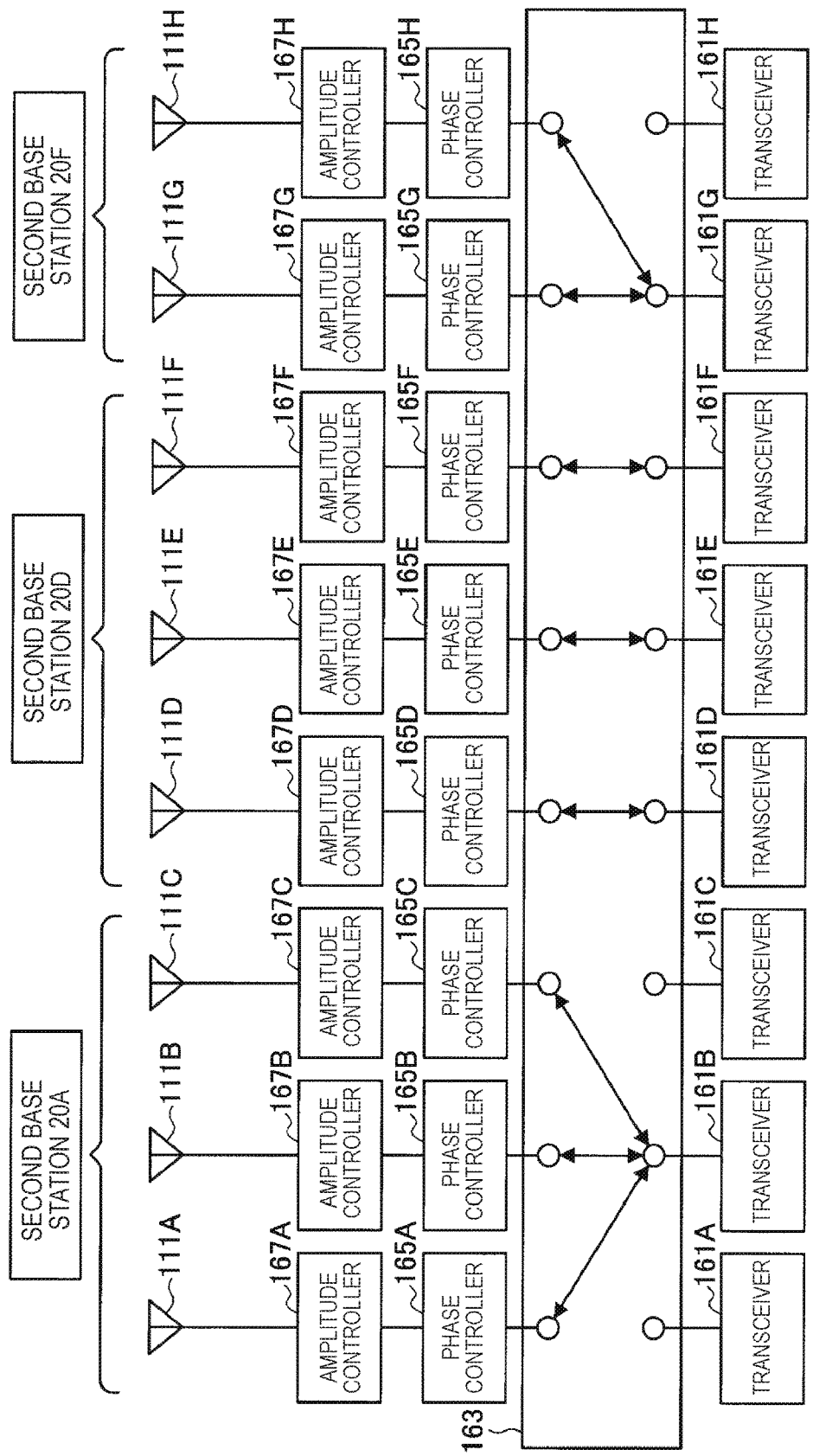
FIG. 12 is a diagram illustrated to describe a third example of allocation of an antenna element to each of the second base stations.
Figure 13:
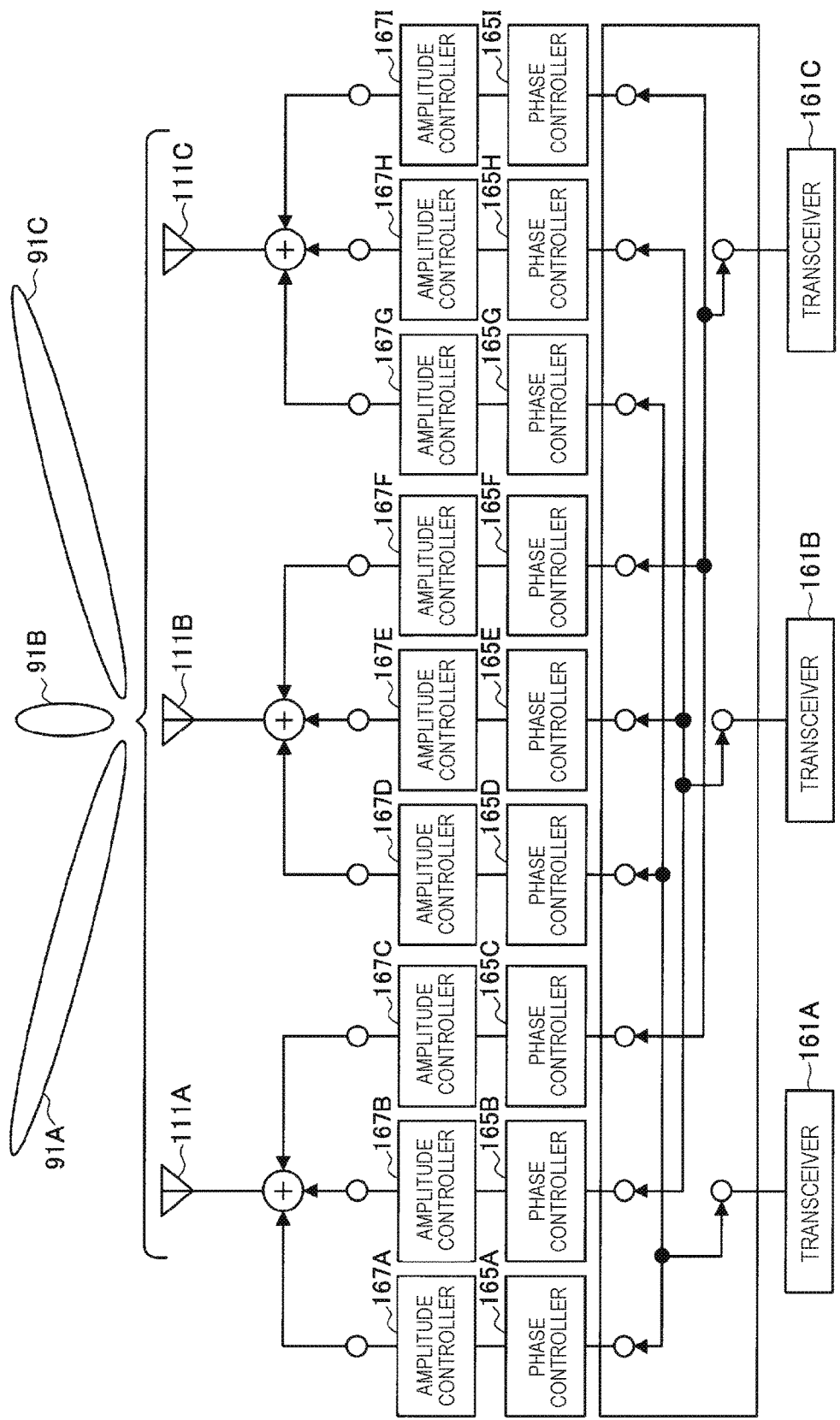
FIG. 13 is a diagram illustrated to describe an example of a case where there is no allocation of an antenna element to the second base station.

Furthermore, the control by the phase controller 165 and the amplitude controller 167 may be implemented by complex signal processing. In these regards, the examples of FIGS. 11 to 13 are also similar to the example of FIG. 10.

(b-2) Second Example

Figure 11:
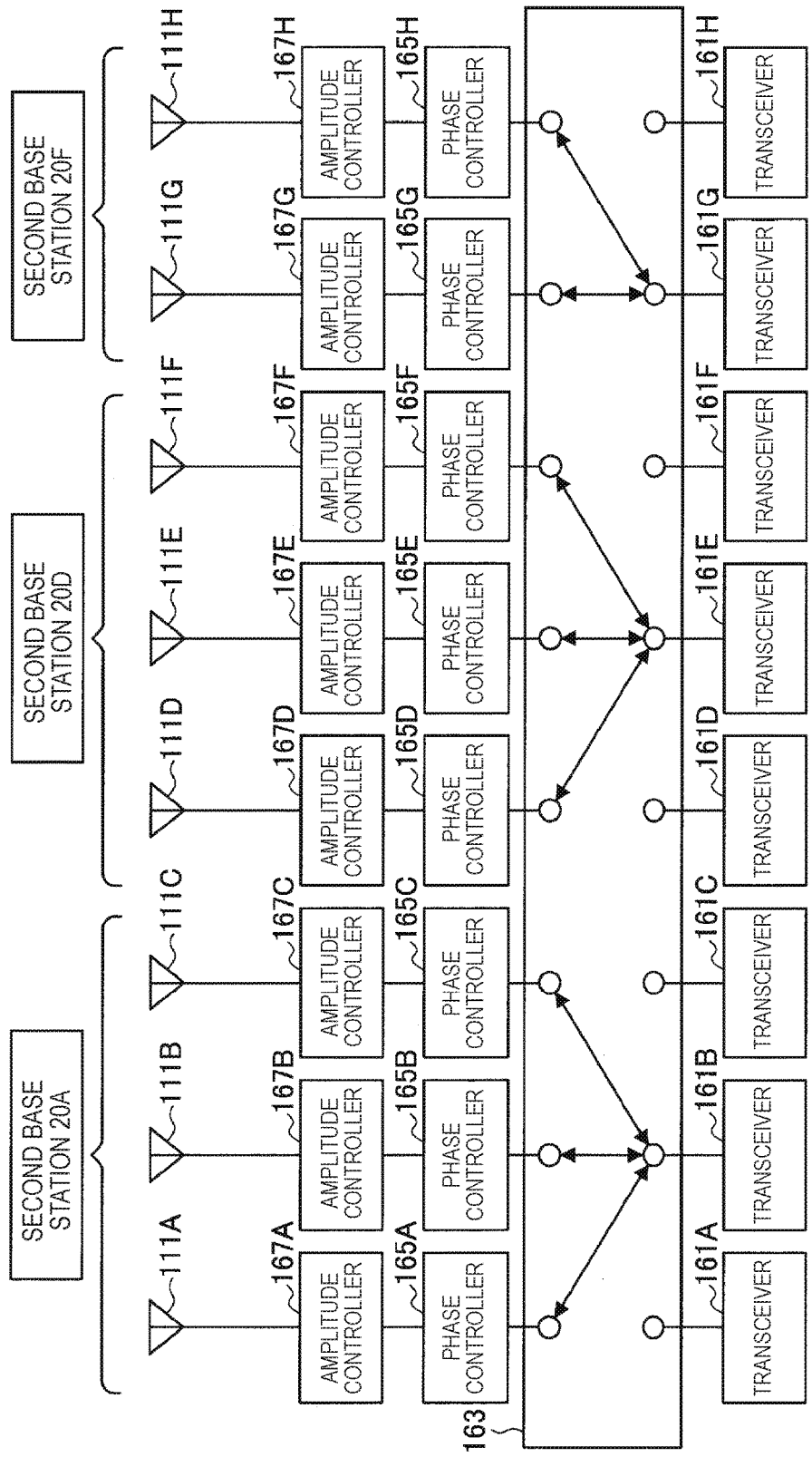
FIG. 11 is a diagram illustrated to describe a second example of allocation of an antenna element to each of the second base stations.

FIG. 11 is a diagram illustrated to describe a second example of allocation of antenna elements to each of the second base stations 20. In this example, the antenna elements 111A, 111B, and 111C are allocated to the second base station 20A, the antenna elements 111D, 111E, and 111F are allocated to the second base station 20D, and the antenna elements 111G and 111H are allocated to the second base station 20F. The switch 163 connects the transceiver 161B to the antenna elements 111A, 111B, and 111C, connects the transceiver 161E to the antenna elements 111D, 111E, and 111F, and connects the transceiver 161G to the antenna elements 111G and 111H. The transceiver 161B performs processing for transmission and reception to and from the second base station 20A. The transceiver 161E performs processing for transmission and reception to and from the second base station 20D. The transceiver 161G performs processing for transmission and reception to and from the second base station 20F. In one example, the first base station 100 transmits a signal to the second base station 20A by beamforming using the antenna elements 111A, 111B, and 111C. In one example, the first base station 100 controls the phase of a signal in each of the phase controllers 165A, 165B, and 165C for beamforming and controls the amplitude of a signal in each of the amplitude controllers 167A, 167B, and 167C. Specifically, in one example, the first base station 100 controls the phase and amplitude so that the maximum directivity of the formed beam is closer to the direction of arrival of a signal from the second base station 20A. Alternatively, the first base station 100 (e.g., the controller 157) may control the phase and amplitude so that the null direction of the formed beam is closer to the direction of arrival of a signal from the second base station 20 D and/or the second base station 20F. Similarly, in one example, the first base station 100 transmits a signal to the second base station 20D by beamforming using the antenna elements 111D, 111E, and 111F, and transmits a signal to the second base station 20F by beamforming using the antenna elements 111G and 111H.

Moreover, the first base station 100 may transmit a signal to the second base station 20 by diversity instead of beamforming. In one example, the transmission by diversity may be performed in an environment where signal to noise ratio (SNR) is low or where degradation due to fading becomes significantly more severe. In one example, selection of a path that provides the highest SNR, phase matching and multiplication of the same weight, or maximization of SNR by multiplication of the weight of each path signal may be performed.

(b-3) Third Example

FIG. 12 is a diagram illustrated to describe a third example of allocation of antenna elements to each of the second base stations 20. In this example, similarly to the example of FIG. 11, the antenna elements 111A, 111B, and 111C are allocated to the second base station 20A, the antenna elements 111D, 111E, and 111F are allocated to the second base station 20D, and the antenna elements 111G and 111H are allocated to the second base station 20F. Furthermore, similarly to the example of FIG. 11, the switch 163 connects the transceiver 161B to the antenna elements 111A, 111B, and 111C, and connects the transceiver 161G to the antenna elements 111G and 111H. The transceiver 161B performs processing for transmission and reception to and from the second base station 20A. The transceiver 161G performs processing for transmission and reception to and from the second base station 20F. In particular, in this example, it is determined that an independent path can be formed among the antenna elements 111D, 111E, and 111F. Thus, the switch 163 connects the transceiver 161D to the antenna element 111D, connects the transceiver 161E to the antenna element 111E, and connects the transceiver 161F to the antenna element 111F. Each of the transceivers 161D, 161E, and 161F performs processing for transmission and reception to and from the second base station 20D. Then, the first base station 100 performs wireless communication with the second base station 20D by single-user MIMO.

(c) Case of No Allocation of Antenna Element

One or more of the plurality of antenna elements included in the first base station 100 may be prevented from being allocated to each of the second base stations 20 belonging to the same group. Alternatively, the plurality of antenna elements may be shared between the second base stations 20 belonging to the same group.

FIG. 13 is a diagram illustrated to describe an example of a case where there is no allocation of antenna elements to the second base station 20. Referring to FIG. 13, there are illustrated the antenna element 111, the transceiver 161, the phase controller 165, and the amplitude controller 167, which are included in the first base station 100. The transceiver 161A performs processing for transmission and reception to and from the second base station 20A. Similarly, the signal generated by the transceiver 161A is transmitted from the antenna element 111A via the phase controller 165A and the amplitude controller 167A. Similarly, the signal is transmitted from the antenna element 111B via the phase controller 165D and the amplitude controller 167D, and the signal is transmitted from the antenna element 111C via the phase controller 165G and the amplitude controller 167G. Thus, in one example, a beam 91A is formed in the direction of arrival of the signal transmitted by the second base station 20A. Similarly, the signal generated by the transceiver 161B is transmitted from each of the antenna elements 111B, 111E, and 111H, and consequently, in one example, a beam 91B is formed in the direction of arrival of the signal transmitted by the second base station 20B. Furthermore, the signal generated by the transceiver 161C is transmitted from each of the antenna elements 111C, 111F, and 111I, and consequently, in one example, a beam 91C is formed in the direction of arrival of the signal transmitted by the second base station 20C.

(7) Selection of Multi-Antenna Communication Scheme

In one example, the first base station 100 (the information acquisition unit 155) acquires information indicating a group obtained by grouping the plurality of second base stations 20. Then, the first base station 100 (the controller 157) selects a multi-antenna communication scheme to be applied to the group. Thus, the first base station 100 performs wireless communication with the second base station 20 included in the group according to the selected communication scheme.

(a) Multi-antenna Communication Scheme

In one example, the communication scheme is diversity, spatial multiplexing, or beamforming.

In one example, the communication scheme is single-user MIMO or multi-user MIMO.

(b) Selection Technique (b-1) Number of Second Base Stations 20 Included in Group In a first example, the first base station 100 (the controller 157) selects the communication scheme based on the number of second base stations 20 belonging to the group.

More specifically, in one example, in the case where the group includes only one second base station 20, the first base station 100 (the controller 157) selects the single-user MIMO as the communication scheme to be applied to the group. On the other hand, in the case where the group includes two or more second base stations 20, the first base station 100 (the controller 157) selects the multi-user MIMO as the communication scheme to be applied to the group.

(b-2) Quality of Propagation Channel Between First Base Station 100 and Second Base Station 20

In a second example, the first base station 100 (the controller 157) may select the communication scheme based on information relating to the quality of a propagation channel between each of the second base stations 20 belonging to the group and the first base station 100.

The information relating to the quality of the propagation channel may be the result of measurement by the second base station 20. The measurement may be a measurement of the reception power and/or reception quality of the reference signal transmitted by the first base station 100. The reference signal may be the CRS or other reference signals (e.g., DM-RS). More specifically, the measurement may be a measurement of RSRP and/or RSRQ. The first base station 100 may acquire the result of the measurement through a report of the measurement by the second base station 20. The first base station 100 may instruct the second base station 20 to report the measurement.

Specifically, in one example, if the quality of the propagation channel is not satisfactory, the first base station 100 (the controller 157) may select the diversity as the communication scheme to be applied to the group. Otherwise, the first base station 100 (the controller 157) may select the beamforming or spatial multiplexing as the communication scheme to be applied to the group.

In one example, the multi-antenna communication scheme is selected as described above. This makes it possible, for example, to implement satisfactory wireless communication depending on the environment.

(8) Operation for Measurement

In one example, the first base station 100 (the controller 157) performs an operation for causing the terminal device 30 to measure the cell of the one or more second base stations 20.

In a first example, the first base station 100 (the controller 157) generates system information including a neighbor cell list having a cell ID of the one or more second base stations 20. In one example, the system information is system information block (SIB) 4 and/or SIB 5. Then, the first base station 100 reports the system information.

In a second example, the first base station 100 (the controller 157) generates a measurement configuration (measurement configuration message) including a cell list having a cell ID of the one or more second base stations 20. Then, the first base station 100 transmits the measurement configuration message to the terminal device 30.

This makes it possible, for example, to select a cell of the second base station 20 in the cell selection/cell reselection by the terminal device 30 or the handover of the terminal device 30.

<3.2. Processing Procedure>

Figure 14:
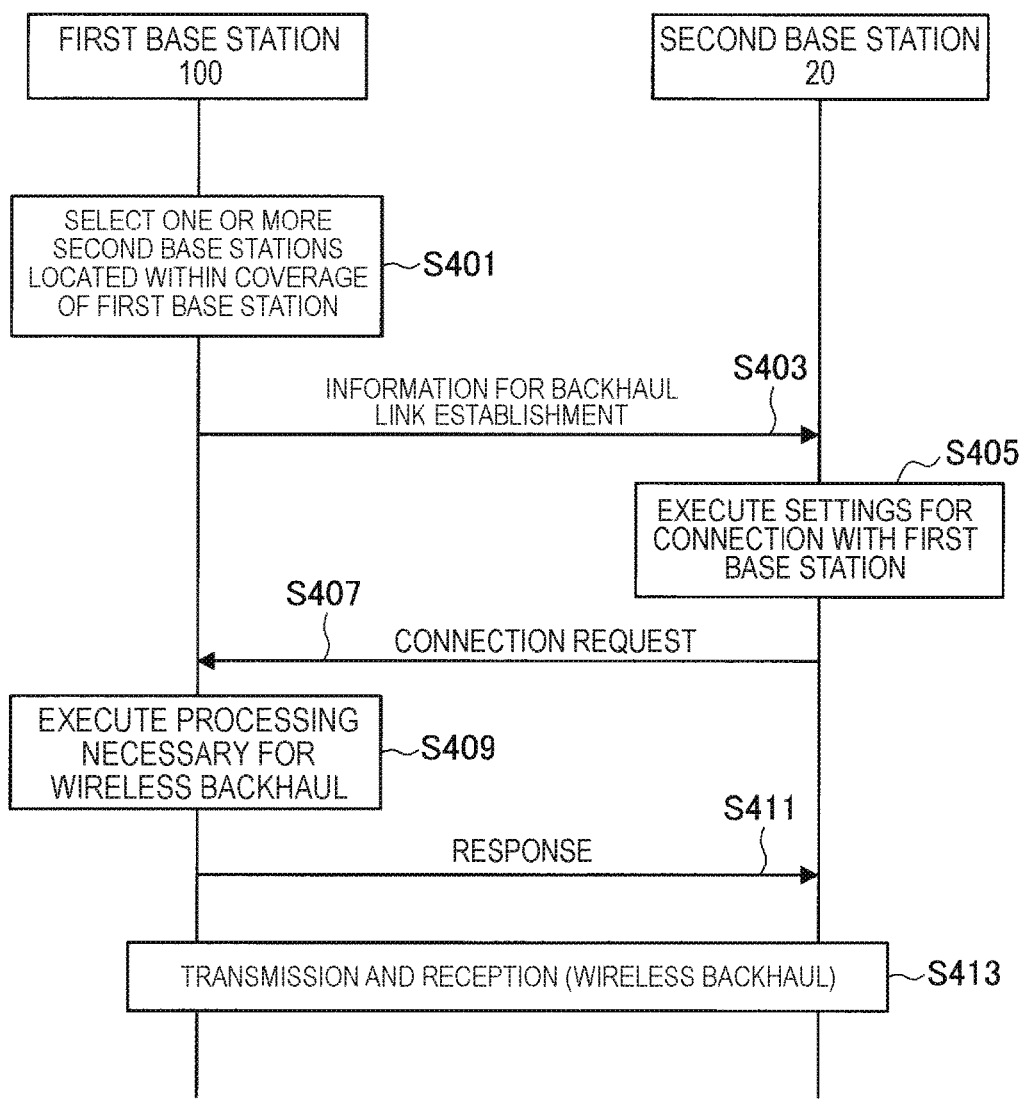
FIG. 14 is a sequence diagram illustrating an example of a schematic procedure of processing according to a first embodiment.

An example of processing according to the first embodiment is now described with reference to FIG. 14. FIG. 14 is a sequence diagram illustrating an example of a schematic procedure of processing according to the first embodiment.

The first base station 100 selects one or more second base stations 20 located within the coverage 10 of the first base station 100 (S401). In one example, the first base station 100 selects the one or more second base stations 20 in the case where a predetermined condition on the traffic of the first base station 100 is satisfied. In one example, the first base station 100, when selecting two or more second base stations 20, performs grouping of the two or more second base stations 20.

Then, the first base station 100 provides information for establishing a wireless backhaul between the first base station 100 and the second base station 20 (i.e., information for backhaul establishment) for the selected one or more second base stations 20 (S403). In one example, the information for backhaul establishment includes identification information of a base station to be connected (i.e., identification information of the first base station 100), information indicating a frequency band for the wireless backhaul, information indicating the maximum transmission power for the wireless backhaul, and/or information indicating a duplex scheme to be applied.

The second base station 20 configures settings for connection with the first base station 100 based on the information for backhaul establishment (S405). An example of the settings includes a frequency band, maximum transmission power, and/or duplex scheme.

Then, the second base station 20 requests a connection to the first base station 100 (S407). In one example, the second base station 20 transmits a connection request message to the first base station 100.

The first base station 100 performs processing necessary for the wireless backhaul in response to the connection request (S407). In one example, the processing includes securing a wireless resource (e.g., securing a frequency band and a period) and/or scheduling a wireless resource.

Furthermore, the first base station 100 responds to the connection request (S411). In one example, the first base station 100 transmits a response message to the second base station 20. In one example, the second base station 20 is notified that the wireless backhaul is established in this response.

Then, the first base station 100 and the selected one or more second base stations 20 perform transmission and reception through the wireless backhaul (S413). In one example, the one or more second base stations 20 communicate with a core network via the first base station 100.

«4. Second Embodiment»

Figure 15:
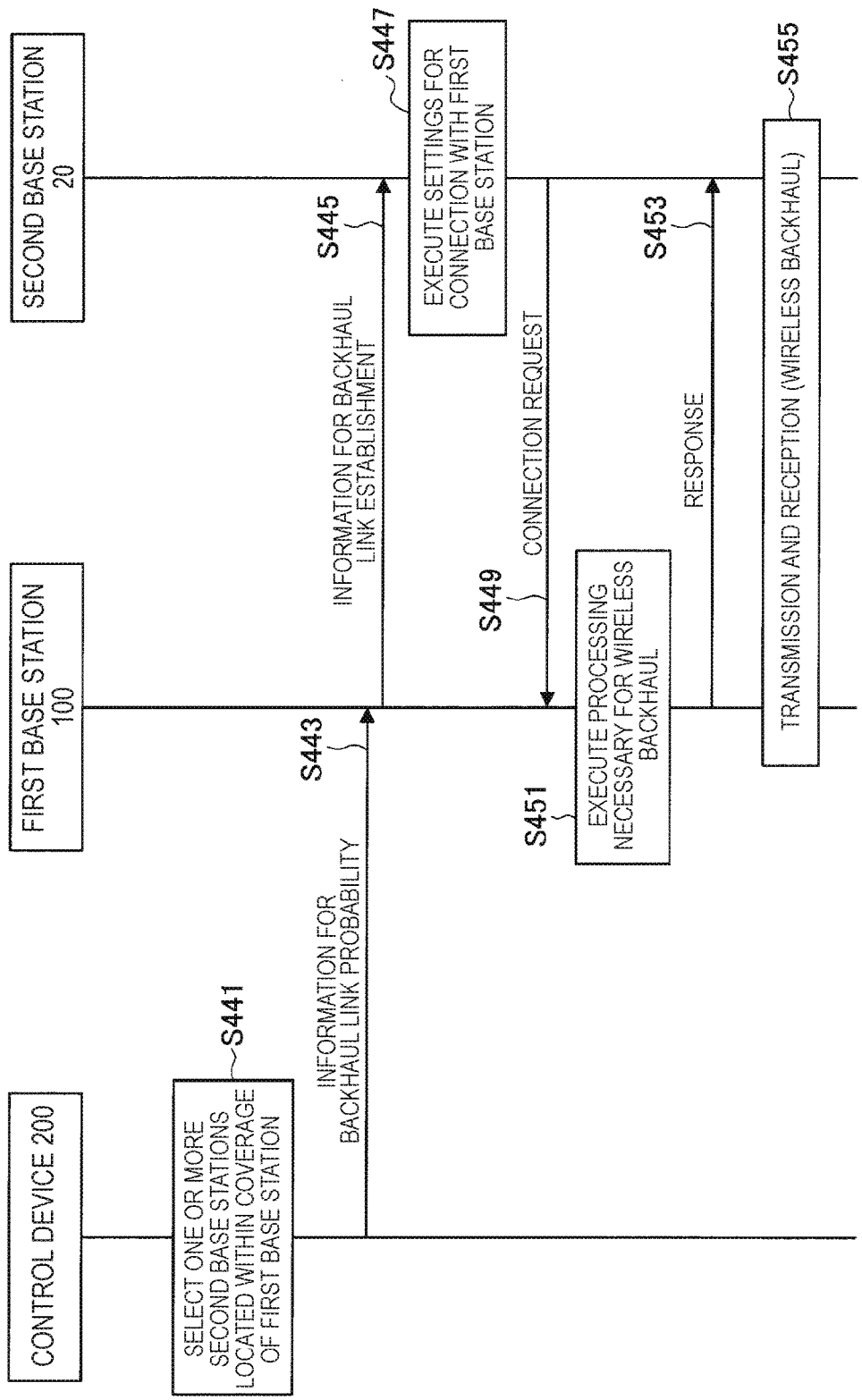
FIG. 15 is a sequence diagram illustrating an example of a schematic procedure of processing according to a second embodiment.

Subsequently, a second embodiment of the present disclosure is now described with reference to FIG. 15.

As described above, various operations relating to the wireless backhaul are performed by the first base station 100 in the first embodiment. On the other hand, some or all of the various operations relating to the wireless backhaul are performed in the second embodiment by the control device 200 instead of the first base station 100.

<4.1. Technical Features>

Technical features according to the second embodiment are now described.

(1) Selection of Second Base Station 20

In one example, the control device 200 (the selector 231) selects one or more second base stations 20 located within the coverage 10 of the first base station 100.

There is no difference in description on this point between the first and second embodiments, except for the subject performing operations. Thus, redundant description will be omitted. Information necessary for selecting the second base station 20 may be provided for the control device 200 from the first base station 100 (or other nodes).

(2) Control of Establishment of Wireless Backhaul (a) Control Device 200

The control device 200 (the information acquisition unit 235) acquires information indicating one or more second base stations 20 located within the coverage 10 of the first base station 100. The control device 200 (the controller 237) controls the establishment of the wireless backhaul between the first base station 100 and each of the one or more second base stations 20.

(a-1) One or More Second Base Stations 20

In one example, the one or more second base stations 20 are one or more second base stations selected by the selector 231 as described above. The information acquisition unit 235 acquires the information indicating one or more second base stations 20 selected by the selector 231.

(a-2) Example of Control

In one example, the control of the establishment of the wireless backhaul includes providing information for establishing the wireless backhaul (hereinafter referred to as "information for backhaul establishment") for the first base station 100.

Contents of Information for Backhaul Establishment

In one example, the information for backhaul establishment includes information indicating the one or more second base stations 20.

Furthermore, the information for backhaul establishment may include information indicating a frequency band for the wireless backhaul, information indicating the maximum transmission power for the wireless backhaul, and/or information indicating a duplex scheme to be applied.

Furthermore, the information for backhaul establishment may include trigger information used to trigger a procedure for establishing a backhaul by the first base station 100 (i.e., a procedure for establishing the wireless backhaul with each of the one or more second base stations 20).

Providing Technique

The control device 200 (the controller 237) provides the information for backhaul establishment for the first base station 100 through the wired backhaul 40.

(b) First Base Station 100

The first base station 100 (the information acquisition unit 155) acquires information indicating one or more second base stations 20 located within the coverage 10 of the first base station 100. The first base station 100 (the controller 157) controls the establishment of a wireless backhaul between the first base station 100 and each of the one or more second base stations 20.

(b-1) One or More Second Base Stations 20

In one example, the one or more second base stations 20 are one or more second base stations selected by the control device 200 (the selector 231) as described above. The information acquisition unit 155 acquires information indicating one or more second base stations 20 selected by the control device 200 (the selector 231).

(b-2) Example of Control

In one example, the control of the establishment of the wireless backhaul includes performing a procedure (i.e., a backhaul establishment procedure) for establishing the wireless backhaul with each of the one or more second base stations 20.

There is no difference in description on this point between the first embodiment and the second embodiment. Thus, redundant description will be omitted.

(3) Plurality of Second Base Stations

In one example, the control device 200 (the selector 231) selects a plurality of second base stations 20 located within the coverage 10 of the first base station 100.

Furthermore, the control device 200 (the information acquisition unit 235) acquires the information indicating the plurality of second base stations 20, and the control device 200 (the controller 237) controls the establishment of the wireless backhaul between the first base station 100 and each of the second base stations 20.

Furthermore, the first base station 100 (the information acquisition unit 155) acquires the information indicating the plurality of second base stations 20, and the first base station 100 (the controller 157) controls the establishment of the wireless backhaul between the first base station 100 and each of the plurality second base stations 20.

(4) Grouping of Second Base Stations 20

In one example, the control device 200 (the grouping unit 233) performs grouping of the plurality of second base stations 20. In grouping, the second base stations 20 capable of having mutually independent paths (i.e., an independent path) in the wireless communication with the first base station 100 are placed in the same group.

There is no difference in description on this point between the first and second embodiments, except for the subject performing operations. Thus, redundant description will be omitted. Information necessary for grouping the second base stations 20 may be provided for the control device 200 by the first base station 100 (or other nodes). The information for backhaul establishment provided for the first base station 100 by the control device 200 may include information indicating one or more groups obtained by the grouping.

Moreover, instead of the grouping by the control device 200, the first base station 100 may perform the grouping as in the first embodiment in the second embodiment.

(5) Allocation to Group

In one example, the first base station 100 (the controller 157) performs the allocation (e.g., allocation of a period or a frequency band) to each of two or more groups.

There is no difference in description on this point between the first embodiment and the second embodiment. Thus, redundant description will be omitted.

Moreover, instead of the first base station 100, the control device 200 (the controller 237) may perform the allocation in the second embodiment. In this case, the control device 200 (the information acquisition unit 235) may acquire the information indicating the two or more groups. In addition, the information necessary for the allocation may be provided for the control device 200 by the first base station 100 (or other nodes). The information for backhaul establishment provided for the first base station 100 by the control device 200 may include information indicating a result obtained from the allocation.

(6) Allocation of Antenna Elements

In one example, the first base station 100 (information acquisition unit 155) acquires information indicating a group obtained by grouping the plurality of second base stations 20. Then, the first base station 100 (the controller 157) allocates one or more antenna elements among a plurality of antenna elements of the first base station 100 to each of the second base stations 20 belonging to the group.

There is no difference in description on this point between the first embodiment and the second embodiment. Thus, redundant description will be omitted.

Moreover, instead of allocation of the one or more antenna elements to each of the second base stations 20 belonging to the group by the first base station 100, the control device 200 (the controller 237) may allocate the one or more antenna elements to each of the second base stations 20 belonging to the group in the second embodiment. In this case, the control device 200 (the information acquisition unit 235) may acquire the information indicating the two or more groups. In addition, the information necessary for the allocation may be provided for the control device 200 by the first base station 100 (or other nodes). The information for backhaul establishment provided for the first base station 100 by the control device 200 may include information indicating the result obtained by allocating antenna elements.

(7) Selection of Multi-antenna Communication Scheme

In one example, the first base station 100 (information acquisition unit 155) acquires information indicating a group obtained by grouping the plurality of second base stations 20. Then, the first base station 100 (the controller 157) selects a multi-antenna communication scheme to be applied to the group. Thus, the first base station 100 performs wireless communication with the second base station 20 included in the group according to the selected communication scheme.

There is no difference in description on this point between the first embodiment and the second embodiment. Thus, redundant description will be omitted.

Instead of the selection of the communication scheme by the first base station 100, the control device 200 (the controller 237) may select the communication scheme. In this case, the control device 200 (the information acquisition unit 235) may acquire information indicating a group obtained by grouping the plurality of second base stations 20. In addition, information necessary for selecting the communication scheme may be provided for the control device 200 by the first base station 100 (or other nodes). The information for backhaul establishment provided for the first base station 100 by the control device 200 may include information indicating the communication scheme.

(8) Operation for Measurement

In one example, the first base station 100 (the controller 157) performs an operation for causing the terminal device 30 to measure the cell of the one or more second base stations 20.

There is no difference in description on this point between the first embodiment and the second embodiment. Thus, redundant description will be omitted.

<4.2. Processing Procedure>

An example of processing according to the second embodiment is now described with reference to FIG. 15. FIG. 15 is a sequence diagram illustrating an example of a schematic procedure of processing according to the second embodiment.

The control device 200 selects one or more second base stations 20 located within the coverage 10 of the first base station 100 (S441). In one example, the control device 200 selects the one or more second base stations 20 in the case where a predetermined condition on the traffic of the first base station 100 is satisfied. In other words, if the predetermined condition is satisfied, the control device 200 selects the first base station 100 and selects the one or more second base stations 20. In one example, the control device 200, when selecting two or more second base stations 20, groups the two or more second base stations 20.

Then, the control device 200 provides information (i.e., information for backhaul establishment) for establishing a wireless backhaul between the first base station 100 and the second base station 20 for the first base station 100 (S443). In one example, the information for backhaul establishment includes information indicating the selected one or more second base stations 20. Furthermore, the information for backhaul establishment may include information indicating a frequency band for the wireless backhaul, information indicating the maximum transmission power for the wireless backhaul, and/or information indicating a duplex scheme to be applied.

Furthermore, the first base station 100 provides information (i.e., information for establishing backhaul establishment) for establishing a wireless backhaul between the first base station 100 and the second base station 20 for the selected one or more second base stations 20 (S445). In one example, the information for backhaul establishment includes identification information of a base station to be connected (i.e., identification information of the first base station 100), information indicating a frequency band for the wireless backhaul, information indicating the maximum transmission power for the wireless backhaul, and/or information indicating a duplex scheme to be applied.

The second base station 20 configures settings for connection with the first base station 100 based on the information for backhaul establishment (S447). In one example, the settings include settings such as a frequency band, maximum transmission power, and/or duplex scheme.

Then, the second base station 20 requests a connection to the first base station 100 (S449). In one example, the second base station 20 transmits a connection request message to the first base station 100.

The first base station 100 performs processing necessary for the wireless backhaul in response to the connection request (S451). In one example, the processing includes securing a wireless resource (e.g., securing a frequency band and a period) and/or scheduling a wireless resource.

Furthermore, the first base station 100 responds to the connection request (S453). In one example, the first base station 100 transmits a response message to the second base station 20. In one example, in this response, the second base station 20 is notified that a wireless backhaul is established.

Thus, the first base station 100 and the selected one or more second base stations 20 perform transmission and reception through the wireless backhaul (S455). In one example, the one or more second base stations 20 communicate with a core network via the first base station 100.

«5. Application Examples»

The technology according to the present disclosure is applicable to various products. In one example, the control device 200 may be implemented as any type of server such as a tower server, a rack server, and a blade server. In addition, at least a part of constituent elements of the control device 200 may be implemented in a module (e.g., an integrated circuit module configured in one die, or a card or blade inserted into a slot of a blade server) mounted in a server.

In one example, the first base station 100 may be implemented as any type of evolved Node B (eNB). In one example, the first base station 100 may be implemented as a macro eNB. Alternatively, the first base station 100 may be implemented as another type of base station such as a NodeB and a base transceiver station (BTS). The first base station 100 may include a main body (also referred to as a base station device) that is configured to control wireless communication and one or more remote radio heads (RRHs) that is disposed in a different place from the main body. Additionally, various types of terminals, which will be described later, may also operate as the first base station 100 by temporarily or semi-permanently executing functions of a base station. Furthermore, at least a part of constituent elements of the first base station 100 may be implemented in a base station device or in a module intended for a base station device.

<5.1. Application Example for Control Device>

Figure 16:
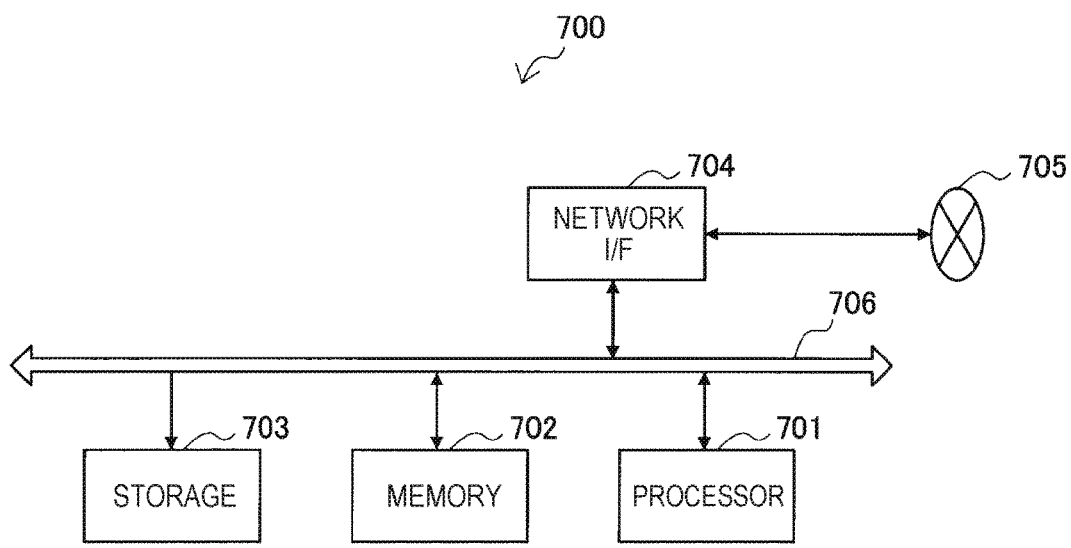
FIG. 16 is a block diagram illustrating an exemplary schematic configuration of a server.

FIG. 16 is a block diagram illustrating an exemplary schematic configuration of a server 700 to which the technology according to the present disclosure may be applied. The server 700 includes a processor 701, a memory 702, a storage 703, a network interface 704, and a bus 706.

The processor 701 may be a central processing unit (CPU) or a digital signal processor (DSP) in one example, and controls various types of functions of the server 700. The memory 702 includes random-access memory (RAM) and read-only memory (ROM), and stores programs executed by the processor 701 or other data. The storage 703 may include a storage medium such as a semiconductor memory and a hard disk.

The network interface 704 is a wired communication interface for connecting the server 700 to a wired communication network 705. The wired communication network 705 may be a core network such as an evolved packet core (EPC), or may be a packet data network (PDN) such as the Internet.

The bus 706 connects the processor 701, the memory 702, the storage 703, and the network interface 704 to each other. The bus 706 may include two or more buses (such as a high-speed bus and a low-speed bus) each of which has different speed.

In the server 700 shown in FIG. 16, one or more constituent elements (the selector 231, the grouping unit 233, the information acquisition unit 235, and/or the controller 237) included in the processing unit 230 described with reference to FIG. 3 may be incorporated in the processor 701. In an example, a program for causing the processor to function as the one or more constituent elements (i.e., a program for causing the processor to execute operations of the one or more constituent elements) may be installed in the server 700, and the processor 701 may execute the program. In another example, the server 700 may have a module that includes the processor 701 and the memory 702 to incorporate the one or more constituent elements in the module. In this case, the module may store a program for causing the processor to function as the one or more constituent elements in the memory 702, and the processor 701 may execute the program. As described above, the server 700 or the module may be provided as a device that includes the one or more constituent elements. The program for causing the processor to function as the one or more constituent elements may be provided. In addition, a readable recording medium on which the program is recorded may be provided.

<5.2. Application Example for First Base Station>

(First Application Example)

Figure 17:
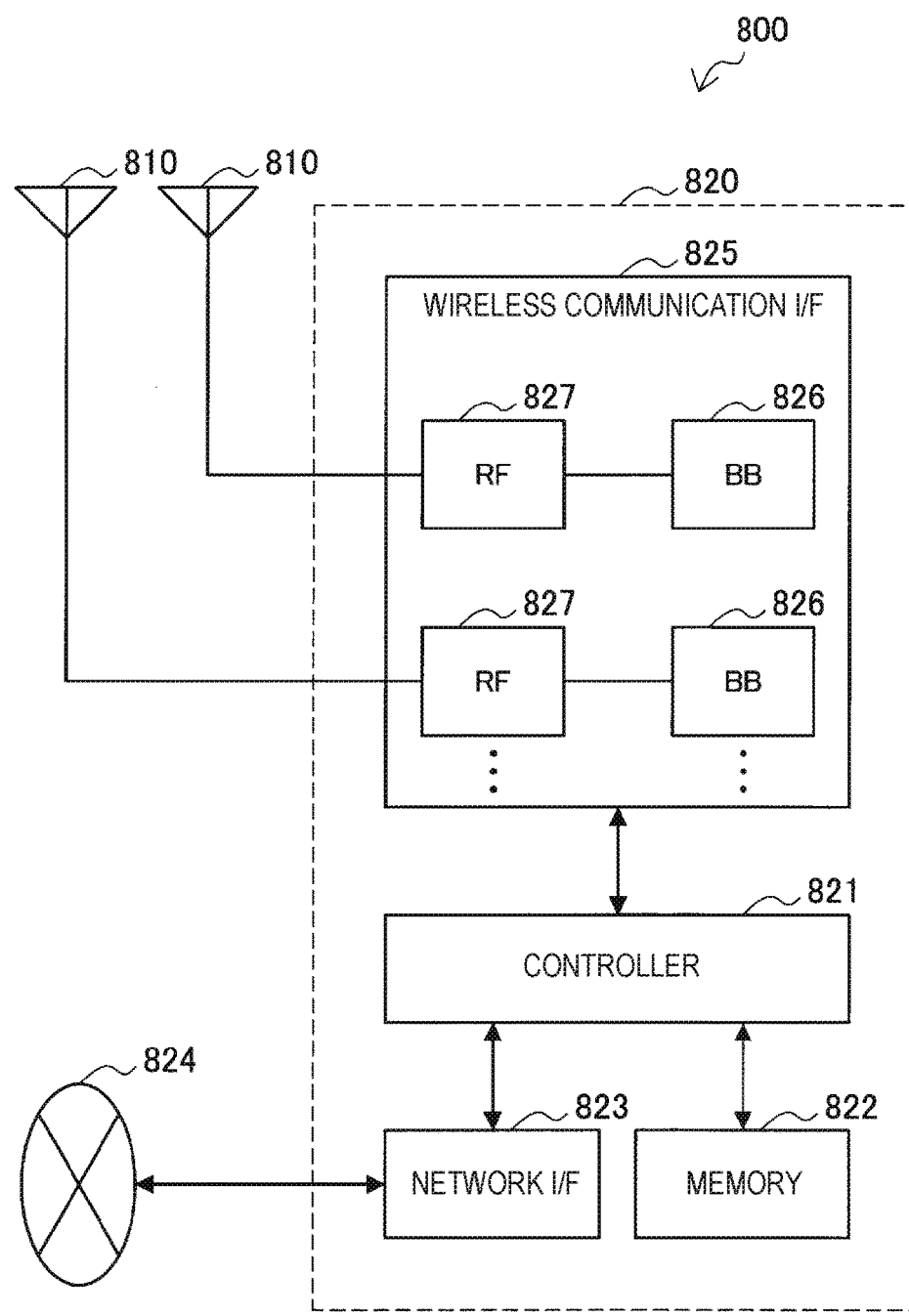
FIG. 17 is a block diagram illustrating a first example of a schematic configuration of eNB.

FIG. 17 is a block diagram illustrating a first example of a schematic configuration of an eNB to which the technology according to the present disclosure may be applied. The eNB 800 includes one or more antennas 810 and a base station device 820. Each of the antennas 810 and the base station device 820 may be connected to each other via an RF cable.

Each of the antennas 810 includes a single or multiple antenna elements (e.g., multiple antenna elements included in a MIMO antenna), and is used for the base station device 820 to transmit and receive wireless signals. The eNB 800 may include the multiple antennas 810 as illustrated in FIG. 17. In one example, the multiple antennas 810 may be individually compatible with a plurality frequency bands used by the eNB 800. Although FIG. 17 illustrates the example in which the eNB 800 includes the multiple antennas 810, the eNB 800 may include a single antenna 810.

The base station device 820 is configured to include a controller 821, a memory 822, a network interface 823, and a wireless communication interface 825.

The controller 821 may be, for example, a CPU or a DSP, and causes various functions of an upper layer of the base station device 820 to be executed. In one example, the controller 821 generates a data packet from data in a signal processed by the wireless communication interface 825, and transfers the generated packet via the network interface 823. The controller 821 may bundle data from multiple baseband processors to generate the bundled packet, and transfer the generated bundled packet. The controller 821 may have logical functions of performing control such as wireless resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (e.g., a list of terminals, transmission power data, and scheduling data).

The network interface 823 is a communication interface for connecting the base station device 820 to a core network 824. The controller 821 may communicate with a core network node or another eNB via the network interface 823. In this case, the eNB 800, and the core network node or the other eNB may be connected to each other through a logical interface (e.g., an S1 interface and an X2 interface). The network interface 823 may also be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection for a terminal positioned in a cell of the eNB 800 via the antenna 810. The wireless communication interface 825 may typically include, for example, a baseband (BB) processor 826 and an RF circuit 827. In one example, The BB processor 826 may perform encoding/decoding, modulating/demodulating, and multiplexing/de-multiplexing, and performs various types of signal processing of layers (e.g., L1, medium access control (MAC), radio link control (RLC), and a packet data convergence protocol (PDCP)). Instead of the controller 821, the BB processor 826 may have a part or all of the logical functions. The BB processor 826 may be a memory that stores a communication control program, or a module that includes a processor and the related circuit configured to execute the program. Updating the program may allow functions of the BB processor 826 to be changed. The module may be a card or blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives a wireless signal via the antenna 810.

The wireless communication interface 825 may include the multiple BB processors 826 as illustrated in FIG. 17. In one example, the multiple BB processors 826 may be individually compatible with multiple frequency bands used by the eNB 800. The wireless communication interface 825 may include the multiple RF circuits 827 as illustrated in FIG. 17. In one example, the multiple RF circuits 827 may be individually compatible with multiple antenna elements. Although FIG. 17 illustrates the example in which the wireless communication interface 825 includes the multiple BB processors 826 and the multiple RF circuits 827, the wireless communication interface 825 may also include a single BB processor 826 or a single RF circuit 827.

One or more of the constituent elements included in the processing unit 150 (the selector 151, the grouping unit 153, the information acquisition unit 155, and/or the controller 157) described above with reference to FIG. 2 may be incorporated in the wireless communication interface 825 of the eNB 800 shown in FIG. 17. Alternatively, the at least part of these constituent elements may be incorporated in the controller 821. In an example, the eNB 800 may have a module that includes a part (e.g., the BB processors 826) or all of the constituent elements of the wireless communication interface 825 and/or the controller 821, and the one or more constituent elements may be incorporated in the module. In this case, the module may store a program for causing a processor to function as the one or more constituent elements (i.e., a program for causing a processor to execute operations of the one or more constituent elements), and to execute the program. In another example, a program for causing a processor to function as the one or more constituent elements may be installed in the eNB 800, and the wireless communication interface 825 (e.g., the BB processors 826) and/or the controller 821 may execute the program. As described above, the eNB 800, the base station device 820, or the module may be provided as a device that includes the one or more constituent elements. A program for causing a processor to function as the one or more constituent elements may be provided. In addition, a readable recording medium on which the program is recorded may be provided.

Furthermore, the wireless communication unit 120 described above with reference to FIG. 2 may be incorporated in the wireless communication interface 825 (e.g., the RF circuit 827) in the eNB 800 shown in FIG. 17. In addition, the antenna unit 110 may be incorporated in the antenna 810. Furthermore, the network communication unit 130 may be incorporated in the controller 821 and/or the network interface 823.

Furthermore, in the eNB 800 shown in FIG. 17, the transceiver 161, the phase controller 165, and the amplitude controller 167, which are described above with reference to FIGS. 10 to 13, may be incorporated in the wireless communication interface 825 (e.g., the BB processor 826). Furthermore, the antenna element 111 may be incorporated in the antenna 810.

(Second Application Example)

Figure 18:
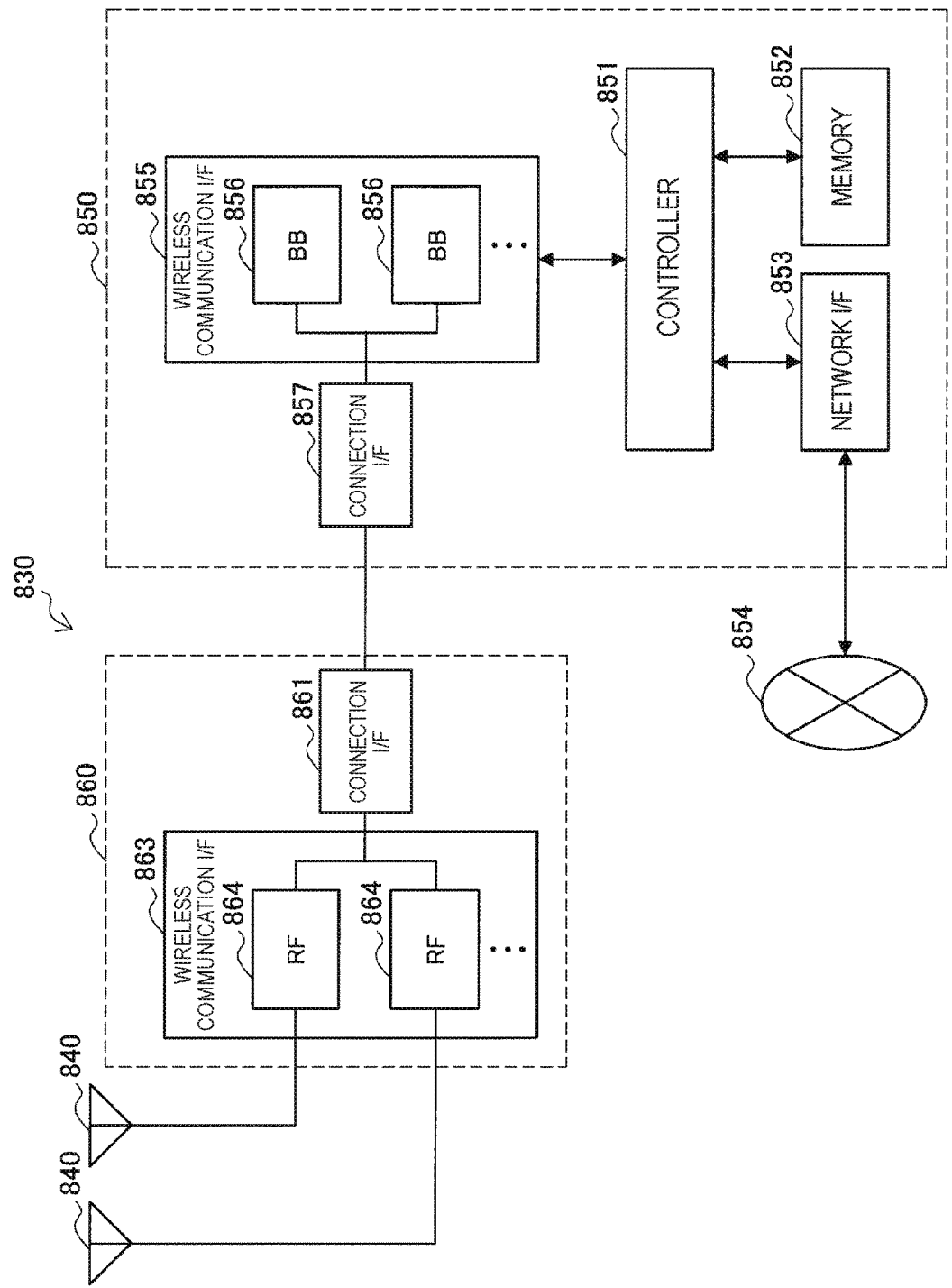
FIG. 18 is a block diagram illustrating a second example of a schematic configuration of eNB.

FIG. 18 is a block diagram illustrating a second example of a schematic configuration of an eNB to which the technology according to the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high-speed line such as an optical fiber cable.

Each of the antennas 840 includes a single or multiple antenna elements (e.g., multiple antenna elements included in a MIMO antenna), and is used for the RRH 860 to transmit and receive a wireless signal. The eNB 830 may include the multiple antennas 840 as illustrated in FIG. 18. In one example, the multiple antennas 840 may be individually compatible with multiple frequency bands used by the eNB 830. Although FIG. 18 illustrates the example in which the eNB 830 includes the multiple antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 17, respectively.

The wireless communication interface 855 supports any cellular communication scheme such as LTE and LTE-Advanced, and provides a wireless connection to a terminal positioned in a sector corresponding to the RRH 860 via the RRH 860 and the antenna 840. The wireless communication interface 855 may typically include, for example, a BB processor 856. The BB processor 856 is similar to the BB processors 826 described above with reference to FIG. 17, except that the BB processors 856 are connected to RF circuits 864 of the RRH 860 via the connection interface 857. The wireless communication interface 855 may include the multiple BB processors 856 as shown in FIG. 18. In one example, the multiple BB processors 856 may be individually compatible with multiple frequency bands used by the eNB 830. Although FIG. 18 illustrates the example in which the wireless communication interface 855 includes the multiple BB processors 856, the wireless communication interface 855 may include a single BB processor 856.

The connection interface 857 is an interface for connecting the base station device 850 (the wireless communication interface 855) to the RRH 860. The connection interface 857 may also be a communication module intended for communication over the high-speed line that connects the base station device 850 (the wireless communication interface 855) to the RRH 860.

The RRH 860 includes a connection interface 861 and a wireless communication interface 863.

The connection interface 861 is an interface for connecting the RRH 860 (the wireless communication interface 863) to the base station device 850. The connection interface 861 may also be a communication module intended for communication over the high-speed line.

The wireless communication interface 863 transmits and receives a wireless signal via the antenna 840. The wireless communication interface 863 may typically include, for example, the RF circuit 864. The RF circuit 864 may include, for example, a mixer, a filter, and an amplifier, and transmits and receives a wireless signal via the antenna 840. The wireless communication interface 863 may include multiple RF circuits 864 as shown in FIG. 18. In one example, the multiple RF circuits 864 may support multiple antenna elements individually. Although FIG. 18 illustrates the example in which the wireless communication interface 863 includes the multiple RF circuits 864, the wireless communication interface 863 may include a single RF circuit 864.

One or more constituent elements included in the processing unit 150 (the selector 151, the grouping unit 153, the information acquisition unit 155, and/or the controller 157) described above with reference to FIG. 2 may be incorporated in the wireless communication interface 855 and/or the wireless communication interface 863 of the eNB 830 shown in FIG. 18. Alternatively, the at least part of these constituent elements may be incorporated in the controller 851. In an example, the eNB 830 may have a module that includes a part or all of the constituent elements of the wireless communication interface 855 (e.g., the BB processors 856), and/or the controller 851, and one or more of the constituent elements may be incorporated in the module. In this case, the module may store a program for causing a processor to function as the one or more constituent elements (i.e., a program for causing a processor to execute operations of the one or more constituent elements) and to execute the program. In another example, a program for causing a processor to function as the one or more constituent elements may be installed in the eNB 830, and the wireless communication interface 855 (e.g., the BB processors 856) and/or the controller 851 may execute the program. As described above, the eNB 830, the base station device 850, or the module may be provided as a device that includes the one or more constituent elements. A program for causing a processor to function as the one or more constituent elements may be provided. In addition, a readable recording medium on which the program is recorded may be provided.

Furthermore, the wireless communication unit 120 described above with reference to FIG. 2 may be incorporated in the wireless communication interface 863 (e.g., the RF circuit 864) of the eNB 830 shown in FIG. 18. In addition, the antenna unit 110 may be incorporated in the antenna 840. Furthermore, the network communication unit 130 may be incorporated in the controller 851 and/or the network interface 853.

Furthermore, in the eNB 830 shown in FIG. 18, the transceiver 161, the phase controller 165, and the amplitude controller 167, which are described above with reference to FIGS. 10 to 13, are incorporated in the wireless communication interface 855 (e.g., the BB processor 856). Furthermore, the antenna element 111 may be incorporated in the antenna 840.

«6. Brief Summary»

Each device and processing according to the embodiments of the present disclosure have been described with reference to FIGS. 1 to 18. According to the embodiments of the present disclosure, the first base station 100 and/or the control device 200 is configured to include the information acquisition unit and the controller. The information acquisition unit acquires information indicating the one or more second base stations 20 located within the coverage 10 of the first base station 100 connected to the wired backhaul. The controller controls the establishment of the wireless backhaul between the first base station 100 and each of the one or more second base stations 20. This makes it possible, for example, to perform cell arrangement flexibly with a smaller burden.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the processing steps in each process in this specification are not strictly limited to execution in a time series following the sequence described in a flowchart or a sequence diagram. In one example, the processing steps in each process may be executed in a sequence that differs from a sequence described herein as a flowchart or a sequence diagram, and furthermore may be executed in parallel.

Furthermore, it is also possible to create a computer program for causing a processor (e.g., CPU or DSP) included in the apparatus (e.g., the control device or the module thereof, the base station, or the base station device or the module thereof) according to the present specification to function as the component (e.g., the selector, the grouping unit, the information acquisition unit, and/or the controller) of the apparatus. Furthermore, it is also possible to provide a recording medium having the computer program recorded therein. Furthermore, it is also possible to provide an apparatus (e.g., the control device or the module thereof, the base station, or the base station device or the module thereof) including a memory having the computer program stored therein and one or more processors which can execute the computer program. Furthermore, a method including the operations of the components of the apparatus (e.g., the selector, the grouping unit, the information acquisition unit, and/or the controller) is included in the technology according to the present disclosure.

Furthermore, the effects described in this specification are merely illustrative or exemplified effects, and are not limitative. In other words, in conjunction with or in place of the above effects, the technology according to the present disclosure may achieve other effects that are clear to those skilled in the art based on the description of this specification.

Additionally, the present technology may also be configured as below.

(1)

An apparatus including:

an acquisition unit configured to acquire information indicating one or more second base stations located within coverage of a first base station connected to a wired backhaul; and a controller configured to control establishment of a wireless backhaul between the first base station and each of the one or more second base stations.

(2)

The apparatus according to (1), further including:

a selector configured to select the one or more second base stations.

(3)

The apparatus according to (2), wherein the selector selects the one or more second base stations depending on a position and a traffic volume of a terminal device configured to perform wireless communication with the first base station.

(4)

The apparatus according to any one of (1) to (3), wherein the acquisition unit acquires information indicating a plurality of second base stations located within the coverage, and the controller controls establishment of a wireless backhaul between the first base station and each of the plurality of second base stations.

(5)

The apparatus according to (4), further including:

a grouping unit configured to perform grouping of the plurality of second base stations so that the second base stations capable of having mutually independent paths in wireless communication with the first base station are placed in a same group.

(6)

The apparatus according to (5), wherein the grouping unit performs the grouping of the plurality of second base stations for each of a downlink and an uplink.

(7)

The apparatus according to (5) or (6), wherein the grouping unit performs the grouping of the plurality of second base stations based on information relating to a position of each of the plurality of second base stations.

(8)

The apparatus according to any one of (5) to (7), wherein the grouping unit performs the grouping of the plurality of second base stations based on information relating to traffic of each of the plurality of second base stations.

(9)

The apparatus according to any one of (5) to (8), wherein the grouping unit performs the grouping of the plurality of second base stations based on a result obtained by measurement of a reference signal by each of the plurality of second base stations, and the measurement includes measuring each of different sets of the reference signal.

(10)

The apparatus according to any one of (4) to (9), wherein the acquisition unit acquires information indicating two or more groups obtained by grouping the plurality of second base stations, and the controller allocates a different period for wireless communication with the first base station to each of the two or more groups.

(11)

The apparatus according to any one of (4) to (10), wherein the acquisition unit acquires information indicating a group obtained by grouping the plurality of second base stations, and the controller allocates one or more antenna elements among a plurality of antenna elements of the first base station, to each of the second base stations belonging to the group.

(12)

The apparatus according to (11), wherein the controller allocates the one or more antenna elements to each of the second base stations belonging to the group based on information relating to a direction of arrival of a signal transmitted by each of the second base stations belonging to the group or information relating to a quality of a propagation channel between each of the second base stations belonging to the group and the first base station.

(13)

The apparatus according to any one of (4) to (12), wherein the acquisition unit acquires information indicating a group obtained by grouping the plurality of second base stations, and the controller selects a multi-antenna communication scheme to be applied to the group.

(14)

The apparatus according to (13), wherein the communication scheme is diversity, spatial multiplexing, or beamforming.

(15)

The apparatus according to (13) or (14), wherein the communication scheme is single-user multiple-input and multiple-output (MIMO) or multi-user MIMO.

(16)

The apparatus according to any one of (13) to (15), wherein the controller selects the communication scheme based on the number of the second base stations belonging to the group or information relating to a quality of a propagation channel between each of the second base stations belonging to the group and the first base station.

(17)

The apparatus according to any one of (1) to (16), wherein each of the one or more second base stations is not a relay station but an independent base station, and has own retransmission control function.

(18)

The apparatus according to any one of (1) to (17), wherein the one or more other base stations are wireless communication devices having a first operation mode for operating as a mobile station and a second operation mode for operating as a base station.

(19)

The apparatus according to any one of (1) to (18), wherein the apparatus is the first base station, a base station device intended for the first base station, or a module intended for the base station device, and the control includes performing a procedure for establishing the wireless backhaul with each of the one or more second base stations.

(20)

The apparatus according to any one of (1) to (18), wherein the apparatus is a control device for controlling the first base station or a module intended for the control device, the control of establishment of the wireless backhaul includes providing information for establishing the wireless backhaul for the first base station, and the information for establishing the wireless backhaul includes information indicating the one or more other base stations.

(21)

A method performed by a processor, the method including:

acquiring information indicating one or more second base stations located within coverage of a first base station connected to a wired backhaul; and controlling establishment of a wireless backhaul between the first base station and each of the one or more second base stations.

(22)

A program causing a processor to execute:

acquiring information indicating one or more second base stations located within coverage of a first base station connected to a wired backhaul; and controlling establishment of a wireless backhaul between the first base station and each of the one or more second base stations.

(23)

A readable storage medium having a program stored therein, the program causing a processor to execute:

acquiring information indicating one or more second base stations located within coverage of a first base station connected to a wired backhaul; and controlling establishment of a wireless backhaul between the first base station and each of the one or more second base stations.

REFERENCE SIGNS LIST 1 system
10 coverage
20 second base station
40 wired backhaul
100 first base station
151 selector
153 grouping unit
155 information acquisition unit
157 controller
200 control device
231 selector
233 grouping unit
235 information acquisition unit
237 controller

The invention claimed is:

1. An apparatus, comprising:

circuitry configured to:

acquire first information of at least one second base station of a plurality of second base stations, wherein the first information indicates that the plurality of second base stations is within a coverage area of a first base station, and the first base station is connected to a server via a wired backhaul;

receive a measurement result of a reference signal from each second base station of the plurality of second base stations, wherein the measurement result includes measured values of different sets of the reference signal;

select the plurality of second base stations based on the measurement result, wherein each second base station of the selected plurality of second base stations is in wireless communication with the first base station via a mutually independent path; and control establishment of a wireless backhaul connection between the first base station and each second base station of the selected plurality of second base stations, based on the first information.

2. The apparatus according to claim 1, wherein the circuitry is further configured to select the at least one second base station of the plurality of second base stations.

3. The apparatus according to claim 2, wherein the circuitry is further configured to select the plurality of second base stations based on a position of a terminal device and a traffic volume of the terminal device, and the terminal device is in wireless communication with the first base station.

4. The apparatus according to claim 1, wherein the circuitry is further configured to select the plurality of second base stations based on a downlink communication and an uplink communication between the first base station and each second base station of the plurality of second base stations.

5. The apparatus according to claim 1, wherein the circuitry is further configured to select the plurality of second base stations based on second information that indicates a position of each second base station of the plurality of second base stations.

6. The apparatus according to claim 1, wherein the circuitry is further configured to select the plurality of second base stations based on third information that indicates a traffic volume of each second base station of the plurality of second base stations.

7. The apparatus according to claim 1, wherein the circuitry is further configured to:

acquire fourth information that indicates at least two third base stations of a plurality of third base stations; and allocate a different period to each third base station of the at least two third base stations of the plurality of third base stations for wireless communication with the first base station.

8. The apparatus according to claim 1, wherein the circuitry is further configured to:

acquire fifth information that corresponds to the selected plurality of second base stations; and allocate at least one unique antenna element of the first base station to each second base station of the selected plurality of second base stations.

9. The apparatus according to claim 8,
wherein the circuitry is further configured to allocate the at least one unique antenna element to each second base station of the selected plurality of second base stations based on one of:
a direction of arrival of a signal transmitted by each second base station of the plurality of second base stations, or
a quality of a propagation channel between each second base station of the plurality of second base stations and the first base station.

10. The apparatus according to claim 1,
wherein the circuitry is further configured to select a multi-antenna communication scheme between the selected plurality of second base stations and the first base station.

11. The apparatus according to claim 10,
wherein the multi-antenna communication scheme is one of diversity, spatial multiplexing, or beamforming.

12. The apparatus according to claim 10,
wherein the multi-antenna communication scheme is one of single-user multiple-input and multiple-output (MIMO) or multi-user MIMO.

13. The apparatus according to claim 10,
wherein the circuitry is further configured to select the multi-antenna communication scheme based on one of a number of the selected plurality of second base stations or a quality of a propagation channel between each second base station of the plurality of second base stations and the first base station.

14. The apparatus according to claim 1,
wherein each second base station of the plurality of second base stations is an independent base station that has a retransmission control function.

15. The apparatus according to claim 1,
wherein the plurality of second base stations comprises wireless communication devices with a first operation mode to operate as a mobile station and a second operation mode to operate as a base station.

16. The apparatus according to claim 1, wherein
the apparatus is one of the first base station or at least a part of elements of a base station device for the first base station, and
the circuitry is further configured to control the establishment of the wireless backhaul connection based on a procedure to establish the wireless backhaul connection with each second base station of the selected plurality of second base stations.

17. The apparatus according to claim 1, wherein
the apparatus is one of a control device or a module of the control device,
the control device is configured to control the first base station, and the circuitry is further configured to transmit second information to establish the wireless backhaul connection for the first base station.

18. The apparatus according to claim 1,
wherein the first base station simultaneously communicates wirelessly with the selected plurality of second base stations in a period allocated to the selected plurality of second base stations, based on a same frequency band.

19. A method, comprising:
acquiring information of at least one second base station of a plurality of second base stations, wherein
the information indicates that the plurality of second base stations is within a coverage area of a first base station, and
the first base station is connected to a server via a wired backhaul;
receiving a measurement result of a reference signal from each second base station of the plurality of second base stations,
wherein the measurement result includes measured values of different sets of the reference signal;
selecting the plurality of second base stations based on the measurement result,
wherein each second base station of the selected plurality of second base stations is in wireless communication with the first base station via a mutually independent path; and
controlling establishment of a wireless backhaul connection between the first base station and each second base station of the selected plurality of second base stations, based on the information.

20. A non-transitory computer-readable medium having stored thereon computer-executable instructions which, when executed by a processor, cause the processor to execute operations, the operations comprising:
acquiring information of at least one second base station of a plurality of second base stations, wherein
the information indicates that the plurality of second base stations is within a coverage area of a first base station, and
the first base station is connected to a server via a wired backhaul;
receiving a measurement result of a reference signal from each second base station of the plurality of second base stations,
wherein the measurement result includes measured values of different sets of the reference signal;
selecting the plurality of second base stations based on the measurement result,
wherein each second base station of the selected plurality of second base stations is in wireless communication with the first base station via a mutually independent path; and
controlling establishment of a wireless backhaul connection between the first base station and each of the selected plurality of second base stations, based on the information.

* * * * *